(12) United States Patent
Ye et al.

(10) Patent No.: US 9,224,248 B2
(45) Date of Patent: Dec. 29, 2015

(54) METHOD OF VIRTUAL MAKEUP ACHIEVED BY FACIAL TRACKING

(71) Applicant: UL See Inc., Taipei (TW)

(72) Inventors: Zhou Ye, Foster City, CA (US); Ying-Ko Lu, Taoyuan County (TW); Yi-Chia Hsu, Tainan (TW); Sheng-Wen Jeng, Taipei (TW); Hsin-Wei Hsiao, New Taipei (TW)

(73) Assignee: ULSee Inc., Taipei (TW)

( * ) Notice: Subject to any disclaimer, the term of this patent is extended or adjusted under 35 U.S.C. 154(b) by 57 days.

(21) Appl. No.: 13/962,949

(22) Filed: Aug. 8, 2013

(65) Prior Publication Data

US 2014/0016823 A1    Jan. 16, 2014

Related U.S. Application Data

(63) Continuation-in-part of application No. 13/940,270, filed on Jul. 12, 2013.

(60) Provisional application No. 61/681,629, filed on Aug. 10, 2012, provisional application No. 61/670,638, filed on Jul. 12, 2012.

(51) Int. Cl.
| | |
|---|---|
| *G06K 9/00* | (2006.01) |
| *G06T 19/20* | (2011.01) |
| *G06T 15/50* | (2011.01) |
| *G06T 7/20* | (2006.01) |

(52) U.S. Cl.
CPC ............... *G06T 19/20* (2013.01); *G06T 7/2033* (2013.01); *G06T 15/503* (2013.01); *G06T 2207/10016* (2013.01); *G06T 2207/30201* (2013.01); *G06T 2219/2012* (2013.01)

(58) Field of Classification Search
USPC .............................. 382/115–118, 103
See application file for complete search history.

(56) References Cited

U.S. PATENT DOCUMENTS

| 6,496,594 B1 * | 12/2002 | Prokoski ........................ 382/118 |
| 7,436,987 B2 * | 10/2008 | Takano et al. ................. 382/117 |
| 2002/0191817 A1 * | 12/2002 | Sato et al. ..................... 382/118 |
| 2005/0175234 A1 * | 8/2005 | Sakamoto ..................... 382/154 |
| 2006/0203096 A1 * | 9/2006 | LaSalle et al. ........... 348/208.14 |
| 2009/0202114 A1 * | 8/2009 | Morin et al. .................. 382/118 |
| 2009/0225099 A1 * | 9/2009 | Yuasa .......................... 345/629 |
| 2012/0223956 A1 * | 9/2012 | Saito et al. .................... 345/582 |
| 2013/0169827 A1 * | 7/2013 | Santos et al. ............... 348/207.1 |
| 2014/0119645 A1 * | 5/2014 | Zimet-Rubner et al. ...... 382/165 |

* cited by examiner

*Primary Examiner* — Alex Liew

(74) *Attorney, Agent, or Firm* — Alan D. Kamrath; Kamrath IP Lawfirm, P.A.

(57) ABSTRACT

Method of applying virtual makeup and producing makeover effects to 3D face model driven by facial tracking in real-time includes the steps: capturing static or live facial images of a user; performing facial tracking of facial image, and obtaining tracking points on captured facial image; and producing makeover effects according to tracking points in real time. Virtual makeup can be applied using virtual makeup input tool such as a user's finger sliding over touch panel screen, mouse cursor or an object passing through makeup-allowed area. Makeup-allowed area for producing makeover effects is defined by extracting feature points from facial tracking points and dividing makeup-allowed area into segments and layers; and defining and storing parameters of makeup-allowed area. Virtual visual effects including color series, alpha blending, and/or superposition are capable of being applied. Makeover effect takes into account of lighting condition, facial posture rotation, face size scaling, and face translation, respectively.

18 Claims, 35 Drawing Sheets
(25 of 35 Drawing Sheet(s) Filed in Color)

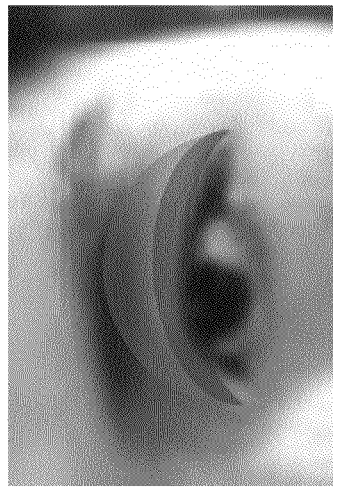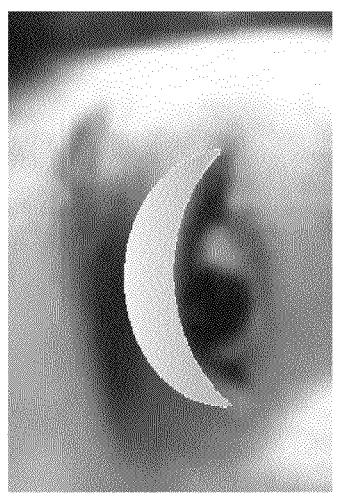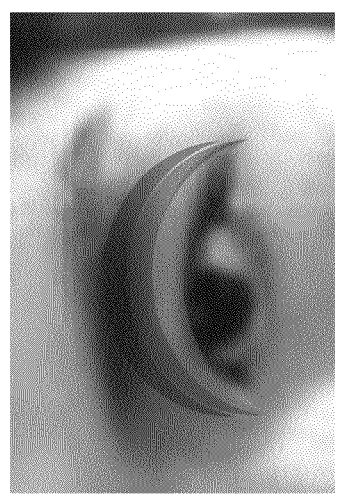
FIG. 16

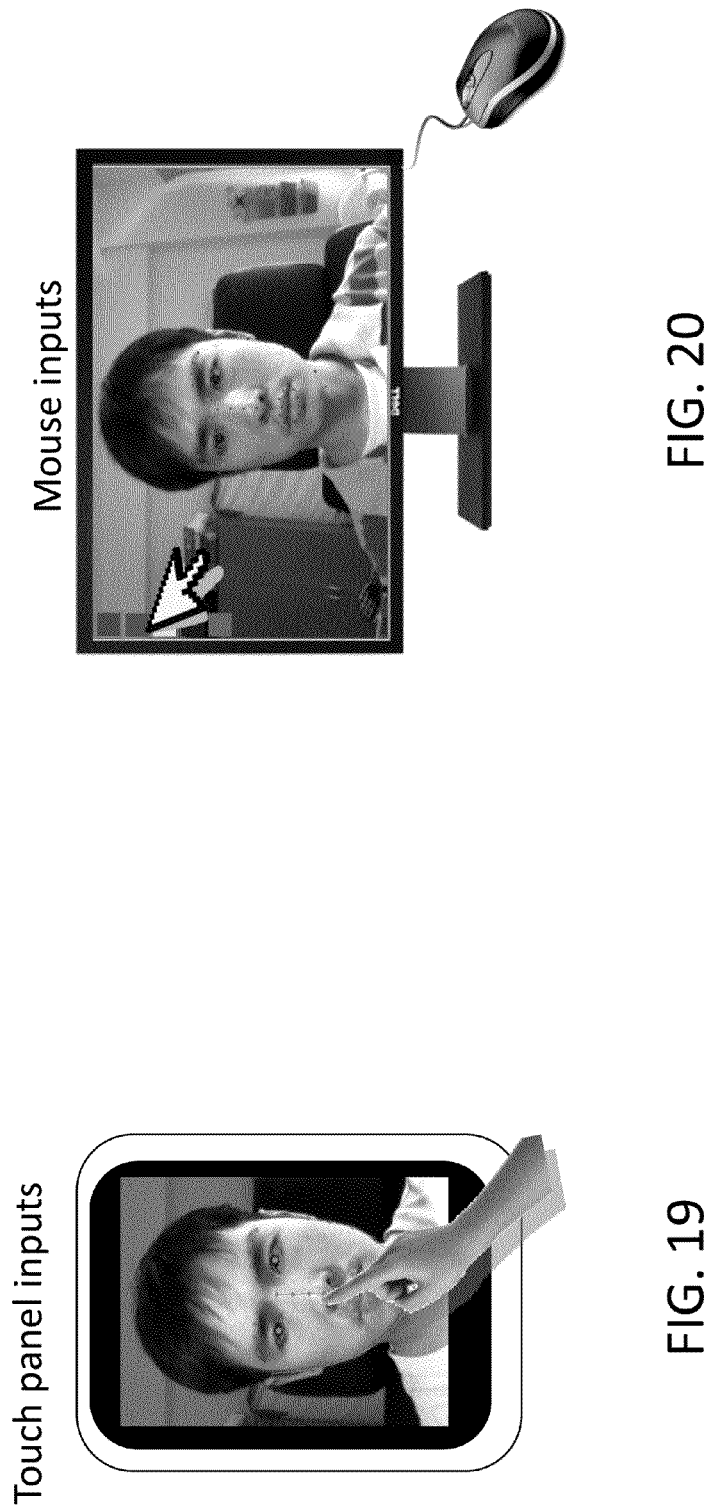

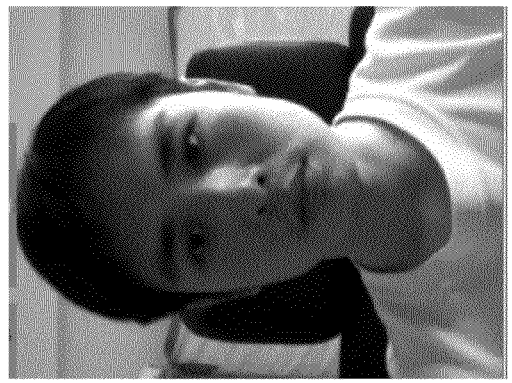
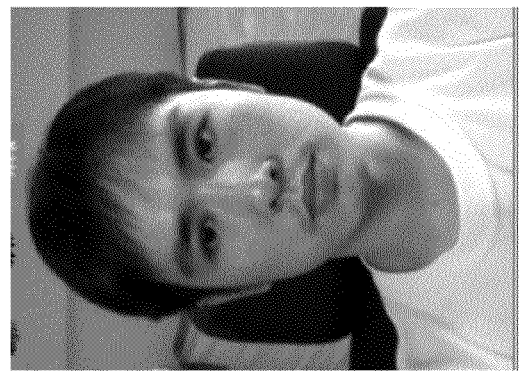
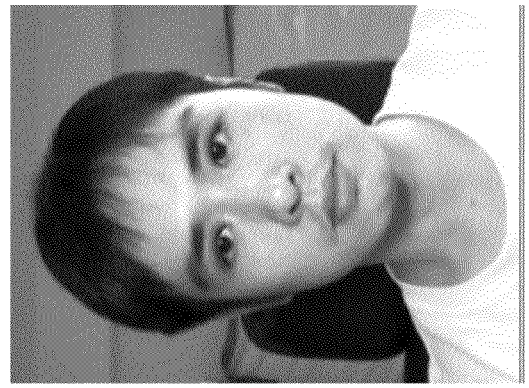
FIG. 26

Combine mirrored texture and tracked 3D face model to apply virtual makeup on raw image of the user
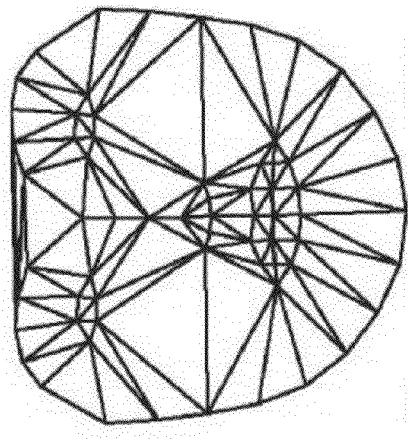
3D face model obtained by facial tracking on raw image
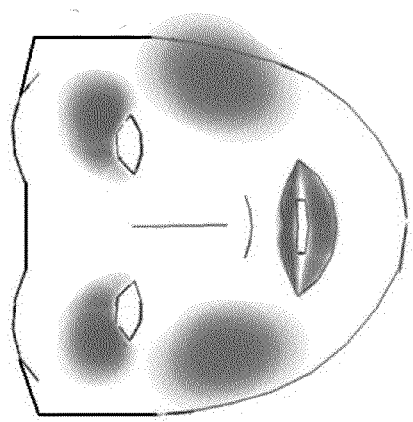
Texture of pre-defined makeup effect for 3D face model
FIG. 29

Combine mirrored texture and tracked 3D face model to show overall virtual makeup
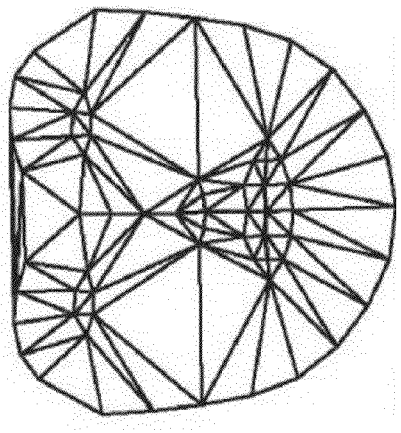
3D face model
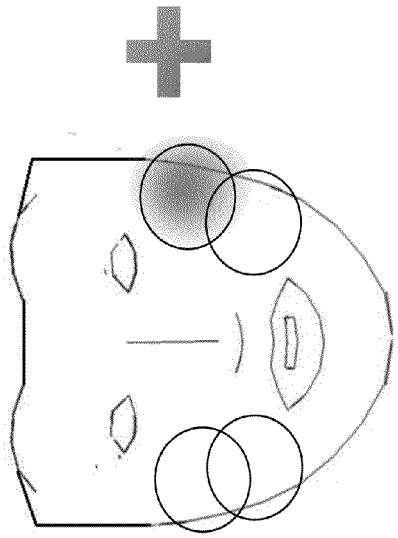
Texture with four pre-defined makeup area for any input of color for 3D face model
FIG. 30a

Combine mirrored texture and tracked 3D face model to show color-overlapped virtual makeup effect
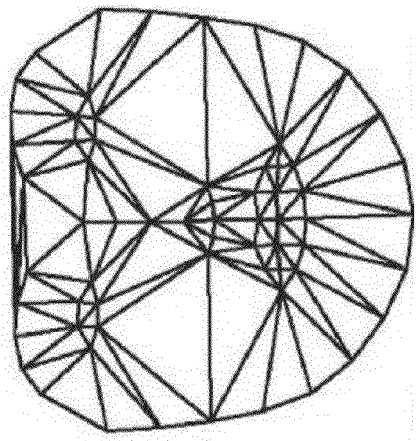
3D face model
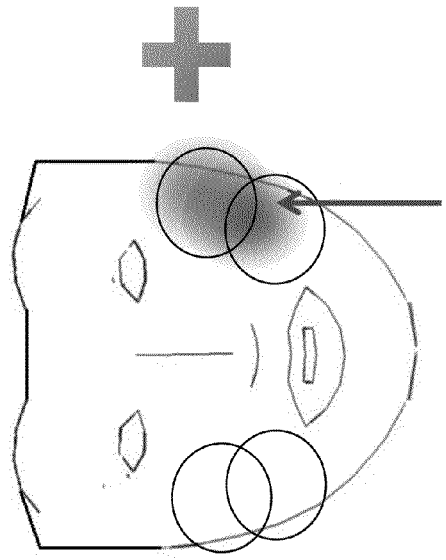
Using mouse cursor, touch control or tip of the object tracking to overlap a blue color makeup effect here
FIG. 30b

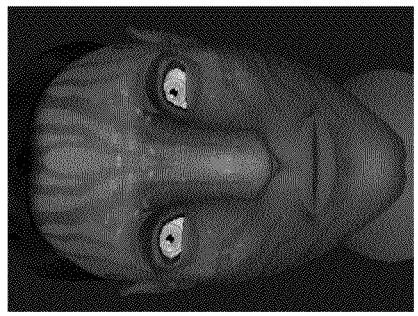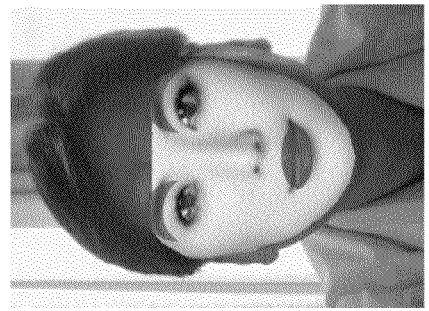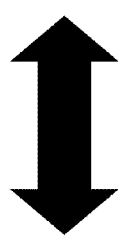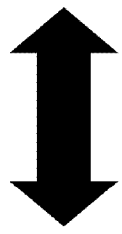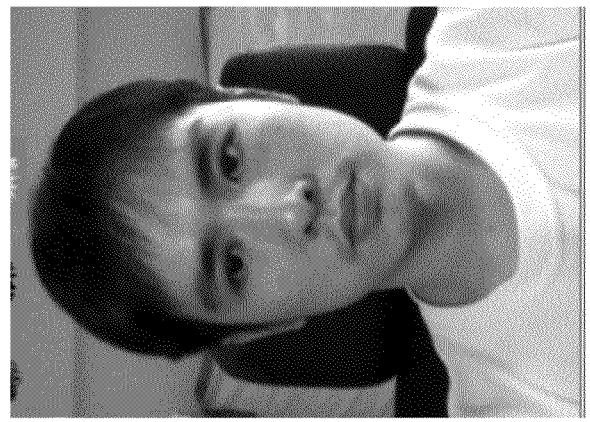
FIG. 31

METHOD OF VIRTUAL MAKEUP ACHIEVED BY FACIAL TRACKING

CROSS-REFERENCE TO RELATED APPLICATIONS

This application is a continuation-in-part of U.S. patent application Ser. No. 13/940,270 filed on Jul. 12, 2013, now pending, which claims the priority benefit of U.S. Provisional Application Ser. No. 61/670,638, filed on Jul. 12, 2012. Furthermore, this application is a non-provisional application which claims the priority benefit of U.S. Provisional Application Ser. No. 61/681,629, filed on Aug. 10, 2012. The contents of each of the above-mentioned patent applications is hereby incorporated by reference herein in its entirety and made a part of this specification.

BACKGROUND OF THE INVENTION

1. Field of the Invention

The present invention relates to a method of applying virtual makeup, and more particularly, to a method of applying virtual makeup and producing virtual makeover effects of a person in real-time driven by facial tracking performed in real-time, and an electronic device configured to use the method of applying virtual makeup.

2. Description of the Prior Art

Digital tracking and modifying of facial features based on a captured image are becoming popular by finding their way into a variety of mobile app and internet applications. Many of the virtual makeup and makeover applications are focused on helping shoppers to try on new cosmetic beauty products in a virtual simulated manner, without physically applying any of such new cosmetic products on the face of the shopper, thereby saving a significant amount of time, as well as bringing forth added entertainment value to the shopper due to the overall experience of performing virtual makeover. A method for applying virtual makeup using the traditional virtual makeup application platform includes the following steps: first, a static image of the user's or a model's face is captured and shown on a LCD display screen. Then the user can select different number of cosmetics colors chosen from a makeup color palette and menu. Performed under an offline process, virtual makeups are then being applied on the captured static image to produce virtual makeover effect. However, the interactive virtual makeover effect is neither intuitive nor lifelike. The simulated virtual makeover effects and results on the user is merely a static image showing the obtained makeup results, rather than providing an interactive application of lifelike virtual makeup simulation on a face having 3D realism. In such virtual makeup system, the various color palettes and menus are provided for a large number of eye shadow, lipstick, blush, liners, foundation, mascara . . . etc. The user can create, customize, and his or her virtual makeup profile by choosing skin, eye, and hair color. In additional commercial cosmetic products are also linked to the specific selected chosen items by the user, and are provided to the user for preview.

Hence, the capability for providing an effective method for interactive virtual makeup to achieve outstanding 3D realism and lifelike performance in real time has become an important topic in this field, and thus there is room for improvement in the art.

SUMMARY OF THE INVENTION

It is one of the objectives of the present invention to provide a method of applying virtual makeup and producing virtual makeup or makeover effects of a person driven by facial tracking in real-time, and an electronic device configured to use the same.

It is one of the objectives of the present invention to provide a method of changing or reapplying virtual makeup for producing virtual makeover effects of a person driven by facial tracking in real-time, and an electronic device configured to use the method of changing or reapplying virtual makeup. In the method of changing or reapplying virtual makeup driven by facing tracking in real-time, the user is capable of controlling application input of makeup command to one or more areas defined within the face when being pointed by a finger alone or via an object tracking.

It is one of the objectives of the present invention to provide a method of changing or reapplying virtual makeup for producing virtual makeover effects of a person driven by facial tracking in real time, and an electronic device configured to use the method of changing or reapplying virtual makeup.

According to an embodiment of the present invention, the makeup is reapplied or changed by the user in real-time during facial tracking via pointing to an area on the face.

According to an embodiment of the present invention, one or more makeup-allowed area can be predefined according to facial tracking.

According to an embodiment of the present invention, the method for applying virtual makeup and producing virtual makeover effects in real-time driven by facial tracking includes a variety of different customized makeup applying input settings and configurations such as segmentation, layers, color blending and superposition.

According to an embodiment of the present invention, a mouse cursor or a touch control or object tracking can be used to apply virtual makeup gradually in real-time driven by facial tracking in the electronic device configured to use the method of applying virtual makeup.

According to an embodiment of the present invention, the virtual makeover or makeup effects can be adjusted in real-time in accordance with rotation/translation/scaling of the face and illumination condition of the operating environment.

According to an embodiment of the present invention, makeup or makeover effect during facial tracking in real time can be produced by using a 2D face model, 3D face model or a 3D model/mask.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The application file contains at least one drawing executed in color. Copies of this patent or patent application publication with color drawing(s) will be provided by the Office upon request and payment of the necessary fee.

The present invention is illustrated by way of example and not limitation in the figures of the accompanying drawings in which like references indicate similar elements. Besides, many aspects of the disclosure can be better understood with reference to the following drawings. Moreover, in the drawings like reference numerals designate corresponding elements throughout. Wherever possible, the same reference numerals are used throughout the drawings to refer to the same or like elements of an embodiment.

FIG. 16 shows three virtual visual effects applied in one eyelid area, including (a) color series, (b) alpha blending, and (c) superposition.

FIG. 19 shows an image representation illustrating the use of user's finger to slide over the makeup-allowed areas on the screen of the touch panel to perform virtual makeup.

FIG. 20 shows an image representation illustrating the use of mouse cursor to pass through the makeup-allowed areas to perform virtual makeup.

FIG. 26 show that the makeover effect produced by the method of applying virtual makeup of a person driven by facial tracking in real-time is dependent of the lighting condition.

FIG. 29 shows virtual makeup applied on a 3D face model using one or more set of pre-defined turnkey makeup texture package according to still yet another embodiment.

FIGS. 30a and 30b show virtual makeup applied on a 3D face model using pre-defined adjustable makeup texture package of still further yet another embodiment, in which color overlapping can be produced using a mouse cursor, touch control or the tip of a tracked object.

FIG. 31 shows virtual makeup applied on a face image of a 3D avatar (aka avatar mode) or a 3D avatar with a face mask (aka mask mode) (in real-time) corresponding to the makeover effects as shown on the raw image of the user during facial tracking in real time.

DETAILED DESCRIPTION OF THE INVENTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

In the descriptions of the embodiments of the present invention, several terms or phrases have been specifically defined and utilized so as to provide sufficient description of various technical aspects for understand of the present invention.

Figure 1:
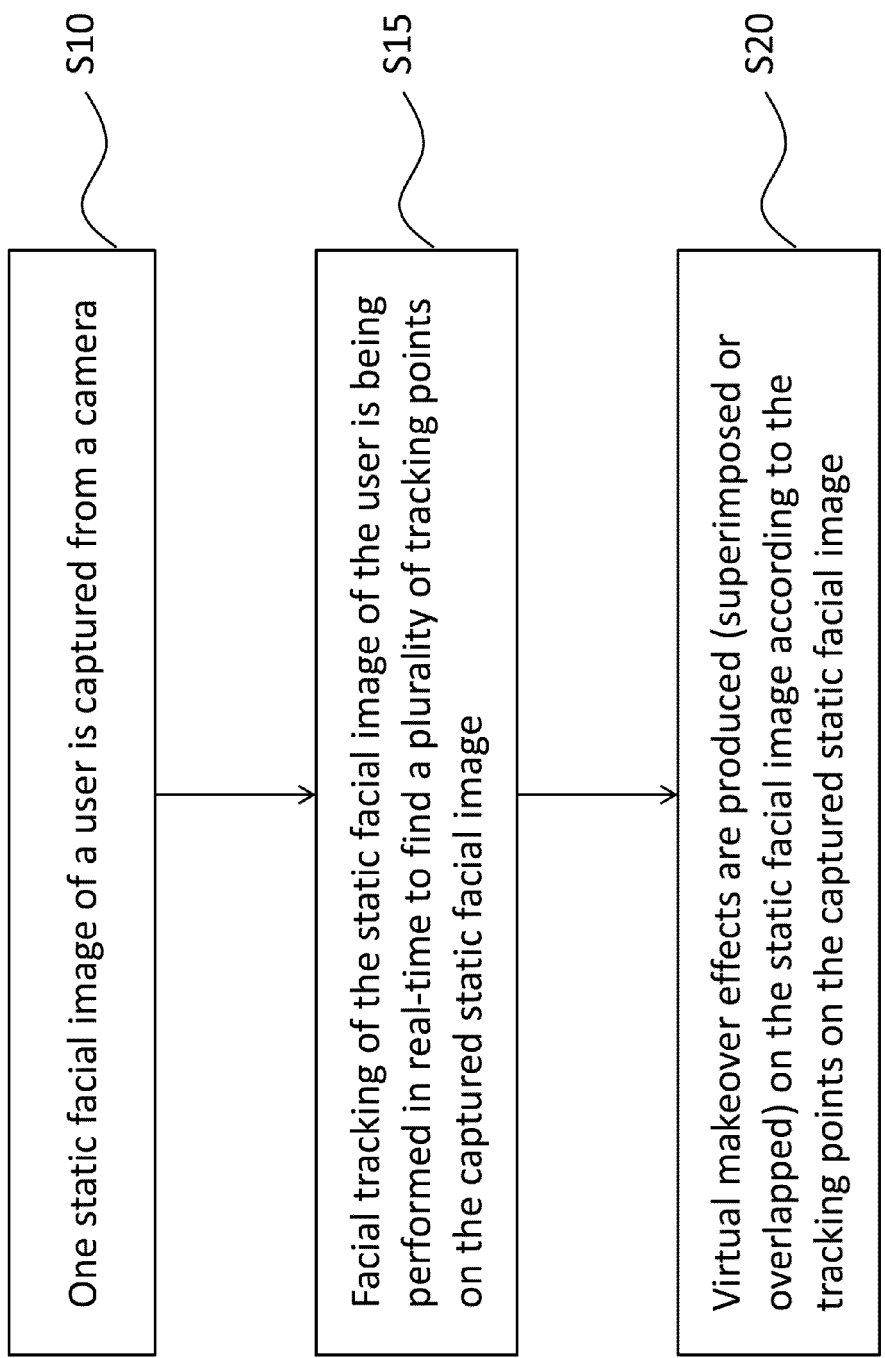
FIG. 1 shows a flowchart illustrating a method of applying virtual makeup and producing virtual makeover effects of a person driven by facial tracking performed in real-time in accordance with a first embodiment.
Figure 2:
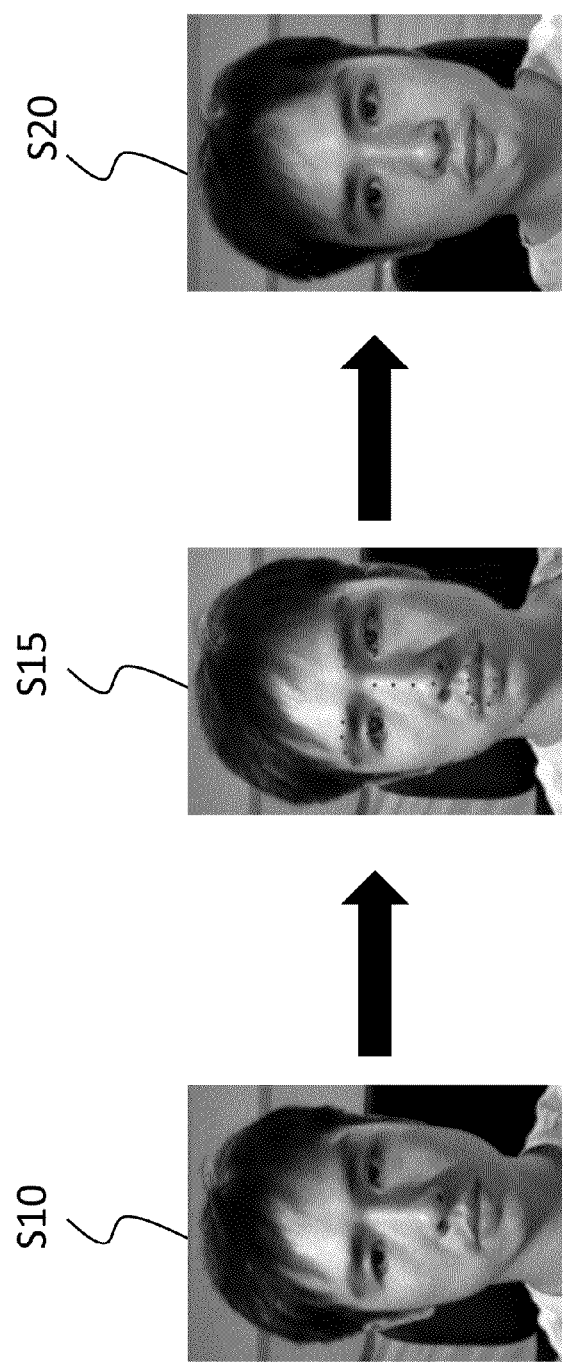
FIG. 2 shows a step-by-step image representation illustrating the method of applying virtual makeup and producing virtual makeover effects in accordance with the first embodiment.

Referring to FIGS. 1 and 2, which show a flow chart together with a step-by-step image representation illustrating a method of applying virtual makeup and producing virtual makeover effects of a person driven by facial tracking performed in real-time in accordance with a first embodiment, this method of applying virtual makeup for producing virtual makeover effects comprising the following steps: Step S10: One static facial image of a user is captured from a camera. Step S15: Facial tracking of the static facial image of the user is being performed in real-time to find a plurality of tracking points on the captured static facial image. Please note that no tracking points need to be visibly shown on the capture static facial image itself, since no manual adjustment of the tracking points is needed or required in the present embodiment. Step S20: Virtual makeover effects are produced (superimposed or overlapped) on the static facial image according to the tracking points on the captured static facial image.

Figure 3:
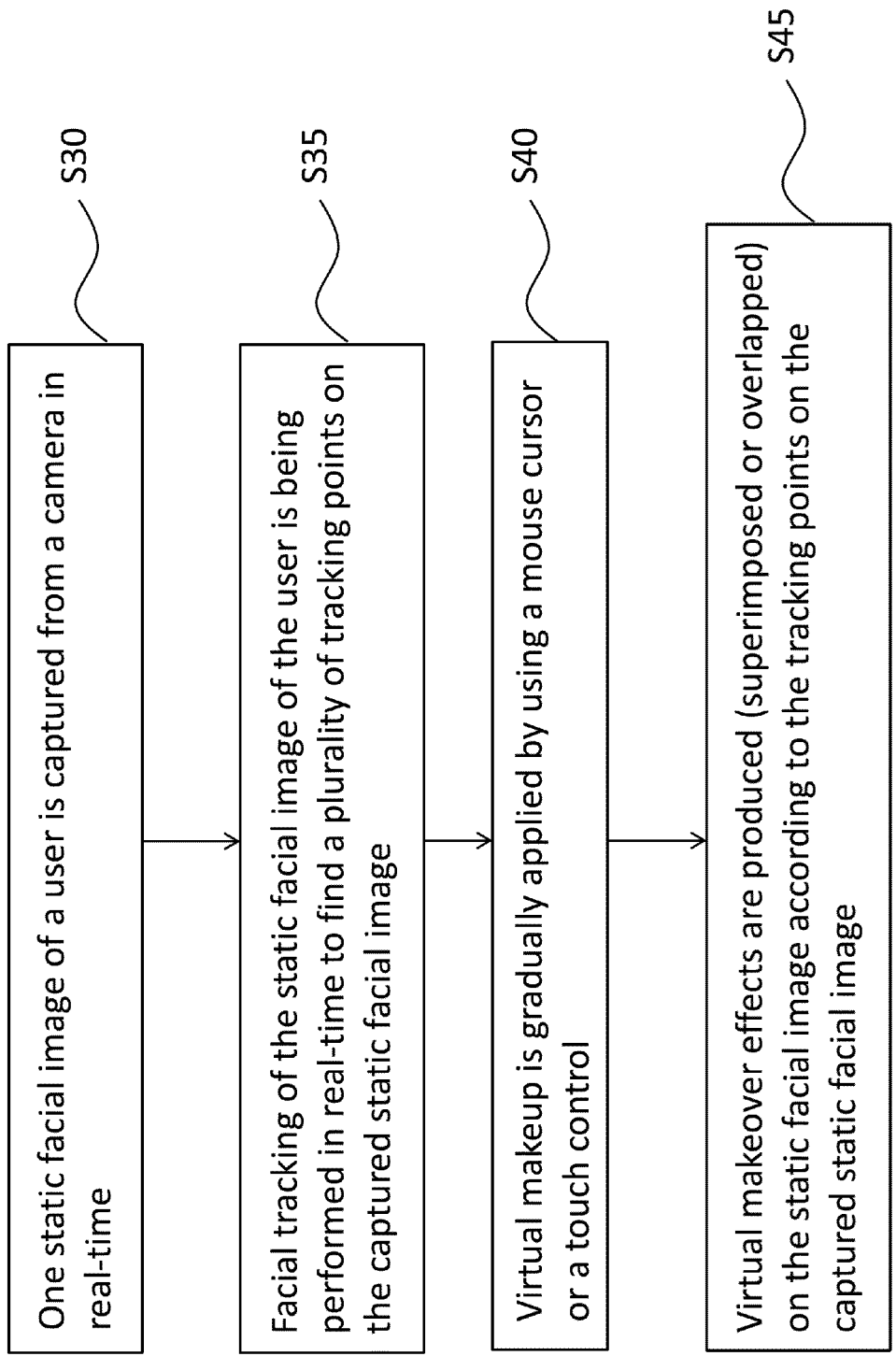
FIG. 3 shows a flowchart illustrating a method of applying virtual makeup and producing virtual makeover effects of a person driven by facial tracking performed in real-time in accordance with a second embodiment.
Figure 4:
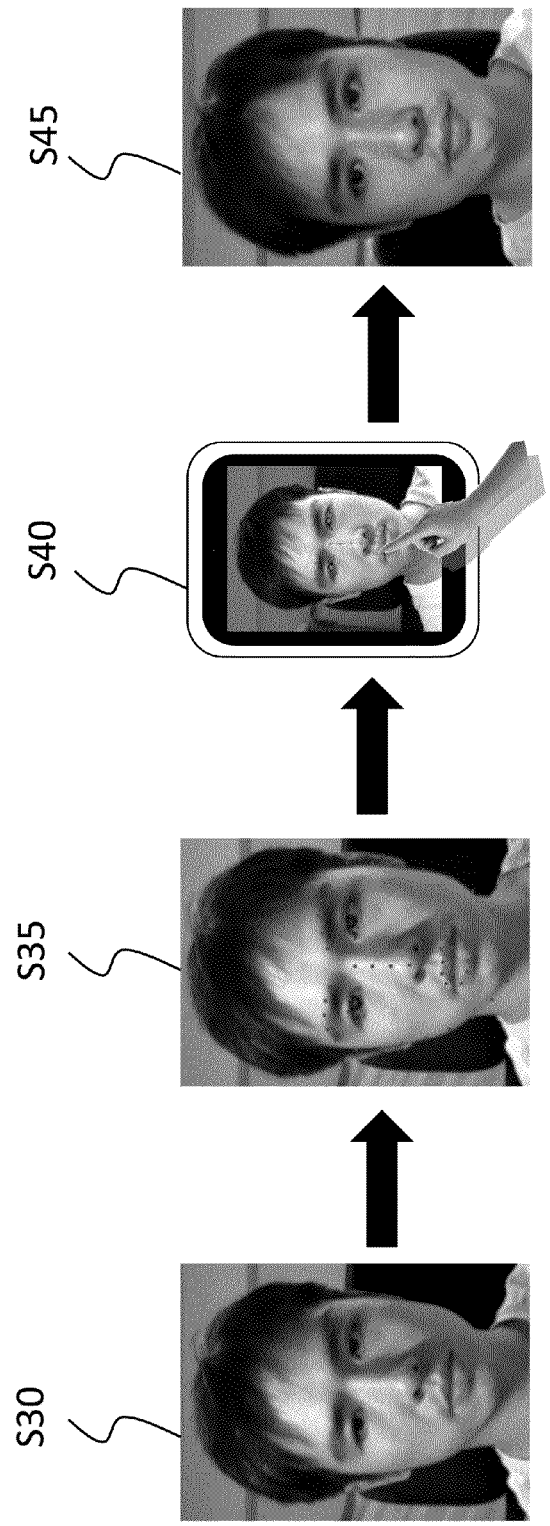
FIG. 4 shows a step-by-step image representation illustrating the method of applying virtual makeup and producing virtual makeover effects in accordance with the second embodiment.

Referring to FIGS. 3 and 4, which show a flow chart together with a step-by-step image representation illustrating a method of applying virtual makeup and producing virtual makeover effects of a person driven by facial tracking performed in real-time in accordance with a second embodiment, this method of applying virtual makeup for producing virtual makeover effects in real-time comprising the following steps: Step S30: One static facial image of a user is captured from a camera in real-time. Step S35: Facial tracking of the static facial image of the user is being performed in real-time to find a plurality of tracking points on the captured static facial image. Please note that no tracking points need to be visibly shown on the capture static facial image itself, since no manual adjustment of the tracking points is needed or required in the present embodiment. Step S40: Virtual makeup is gradually applied by using a mouse cursor or a touch control. Step S45: Virtual makeover effects are produced (superimposed or overlapped) on the static facial image according to the tracking points on the captured static facial image.

Figure 5:
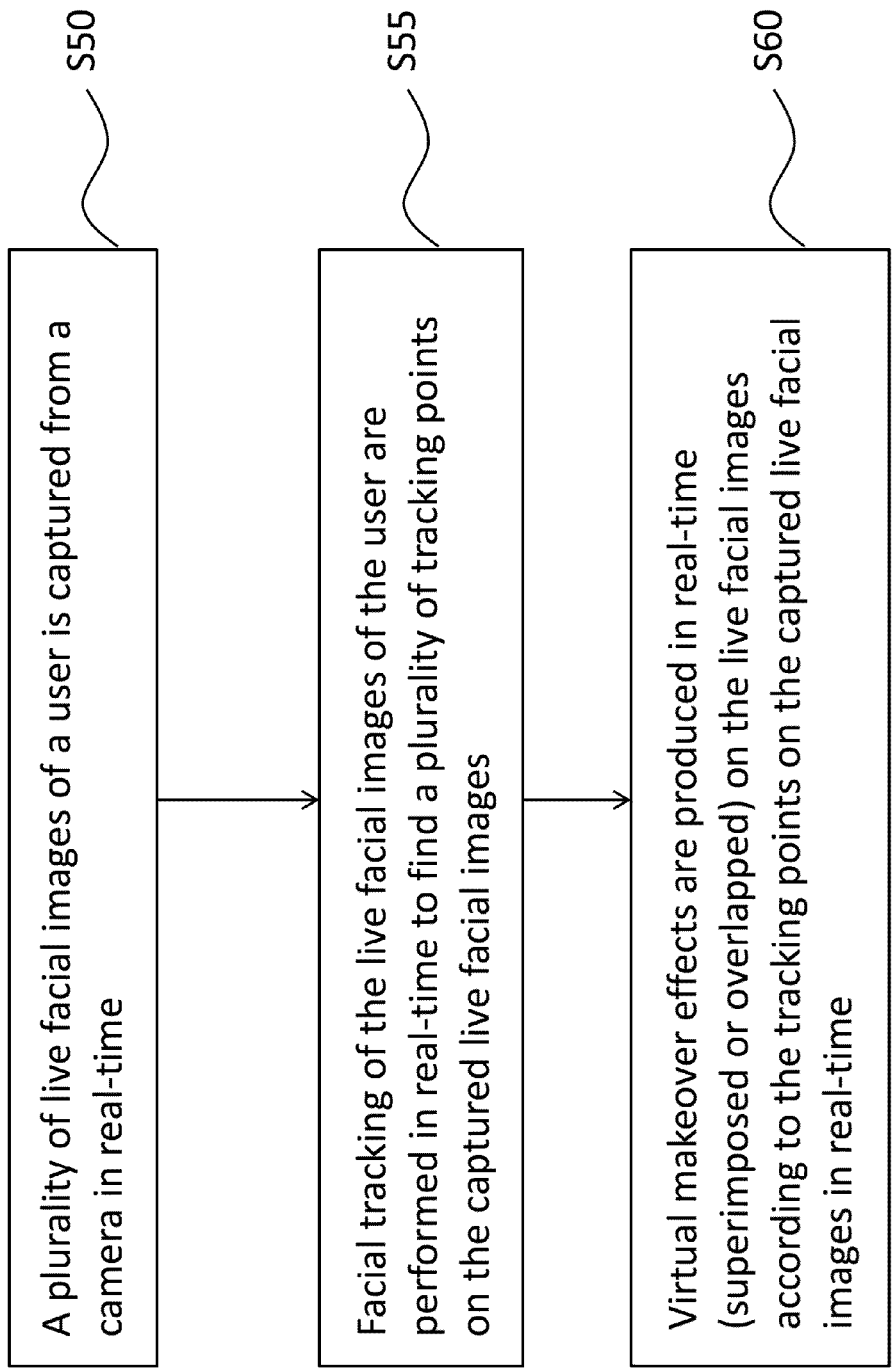
FIG. 5 shows a flowchart illustrating a method of applying virtual makeup and producing virtual makeover effects of a person driven by facial tracking performed in real-time in accordance with a third embodiment.
Figure 6:
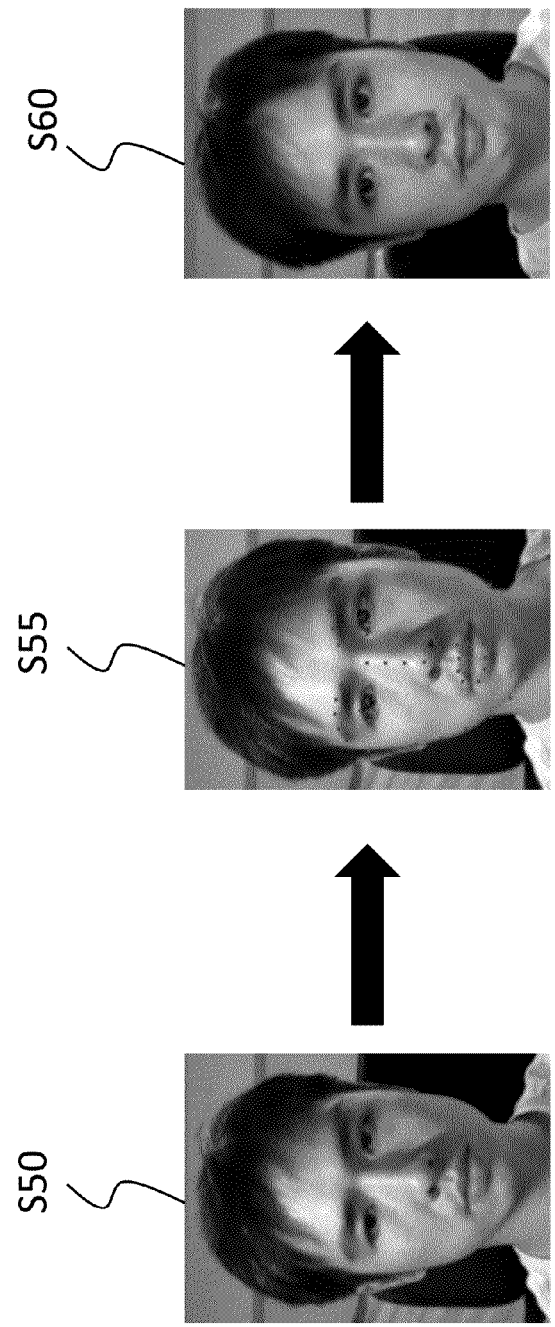
FIG. 6 shows a step-by-step image representation illustrating the method of applying virtual makeup and producing virtual makeover effects in accordance with the third embodiment.

Referring to FIGS. 5 and 6, which show a flow chart together with a step-by-step image representation illustrating a method of applying virtual makeup and producing virtual makeover effects to a 3D face model of a person driven by facial tracking performed in real-time in accordance with a third embodiment, this method of applying virtual makeup for producing virtual makeover effects in real-time comprising the following steps: Step S50: A plurality of live facial images of a user is captured from a camera in real-time. Step S55: Facial tracking of the live facial images of the user are performed in real-time to find a plurality of tracking points on the captured live facial images. Please note that no tracking points need to be visibly shown on the captured live facial images, since no manual adjustment of the tracking points is needed or required in the present embodiment. Step S60: Virtual makeover effects are produced in real-time (superimposed or overlapped) on the live facial images according to the tracking points on the captured live facial images in real-time.

Figure 7:
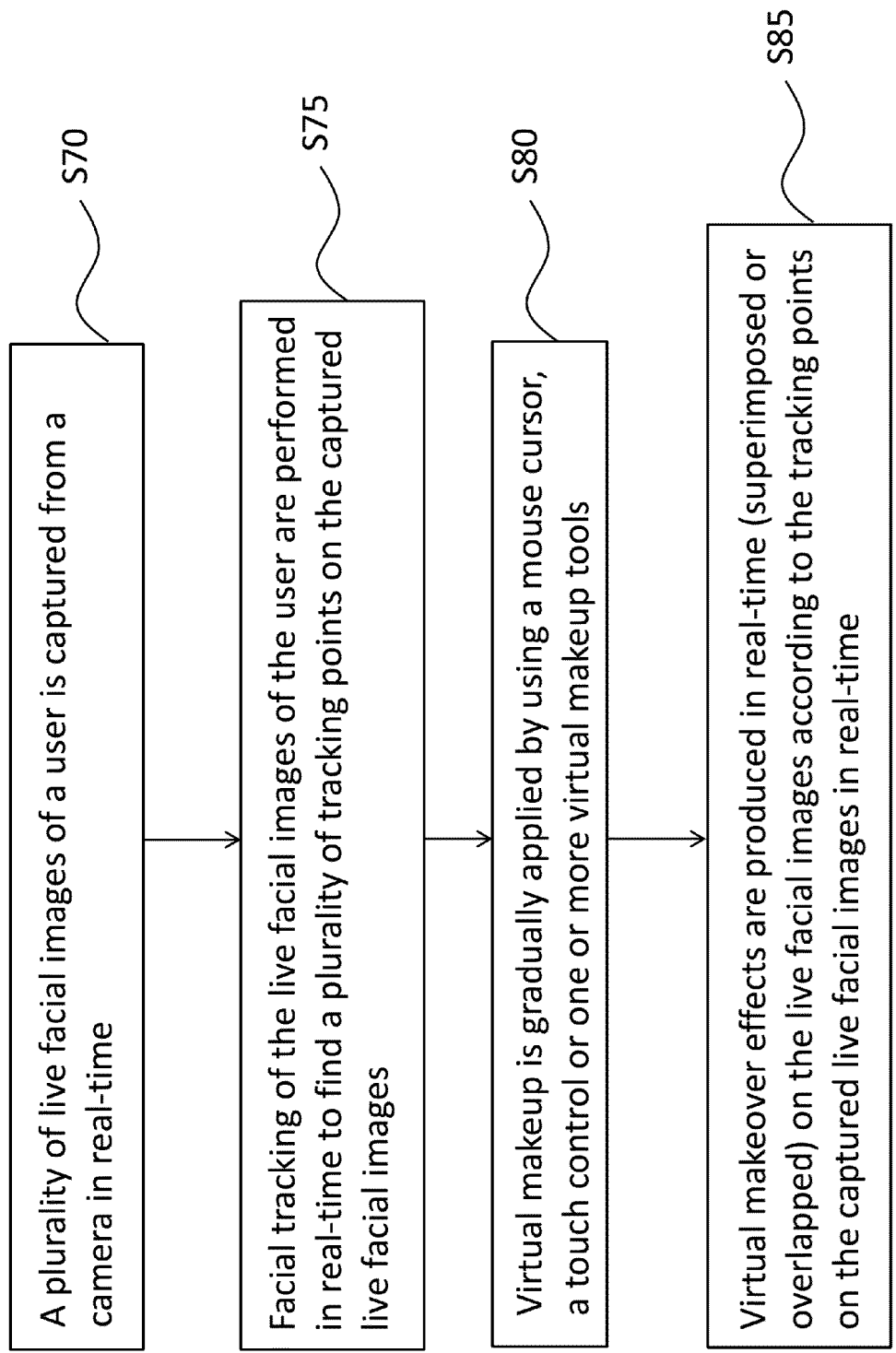
FIG. 7 shows a flowchart illustrating a method of applying virtual makeup and producing virtual makeover effects of a person driven by facial tracking performed in real-time in accordance with a fourth embodiment.
Figure 8:
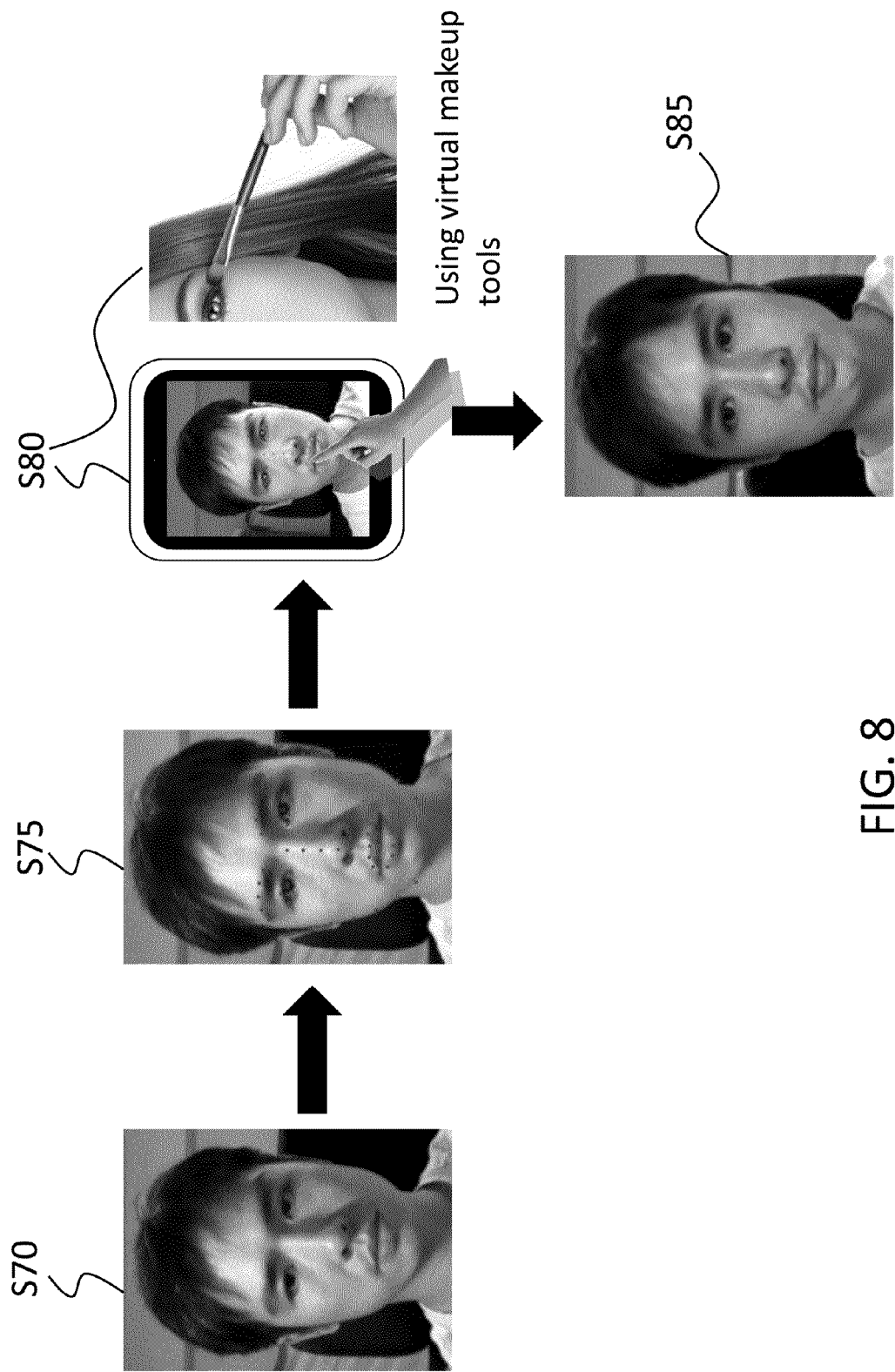
FIG. 8 shows a step-by-step image representation illustrating the method of applying virtual makeup and producing virtual makeover effects in accordance with the fourth embodiment.

Referring to FIGS. 7 and 8, which show a flow chart together with a step-by-step image representation illustrating a method of applying virtual makeup and producing virtual makeover effects to a 3D face model of a person driven by facial tracking performed in real-time in accordance with a fourth embodiment, this method of applying virtual makeup for producing virtual makeover effects in real-time comprising the following steps: Step S70: A plurality of live facial images of a user is captured from a camera in real-time. Step S75: Facial tracking of the live facial images of the user are performed in real-time to find a plurality of tracking points on the captured live facial images. Please note that no tracking points need to be visibly shown on the captured live facial images, since no manual adjustment of the tracking points is needed or required in the present embodiment. Step S80: Virtual makeup is gradually applied by using a mouse cursor, a touch control or one or more virtual makeup tools. Step S85: Virtual makeover effects are produced in real-time (superimposed or overlapped) on the live facial images according to the tracking points on the captured live facial images in real-time.

Figure 9:
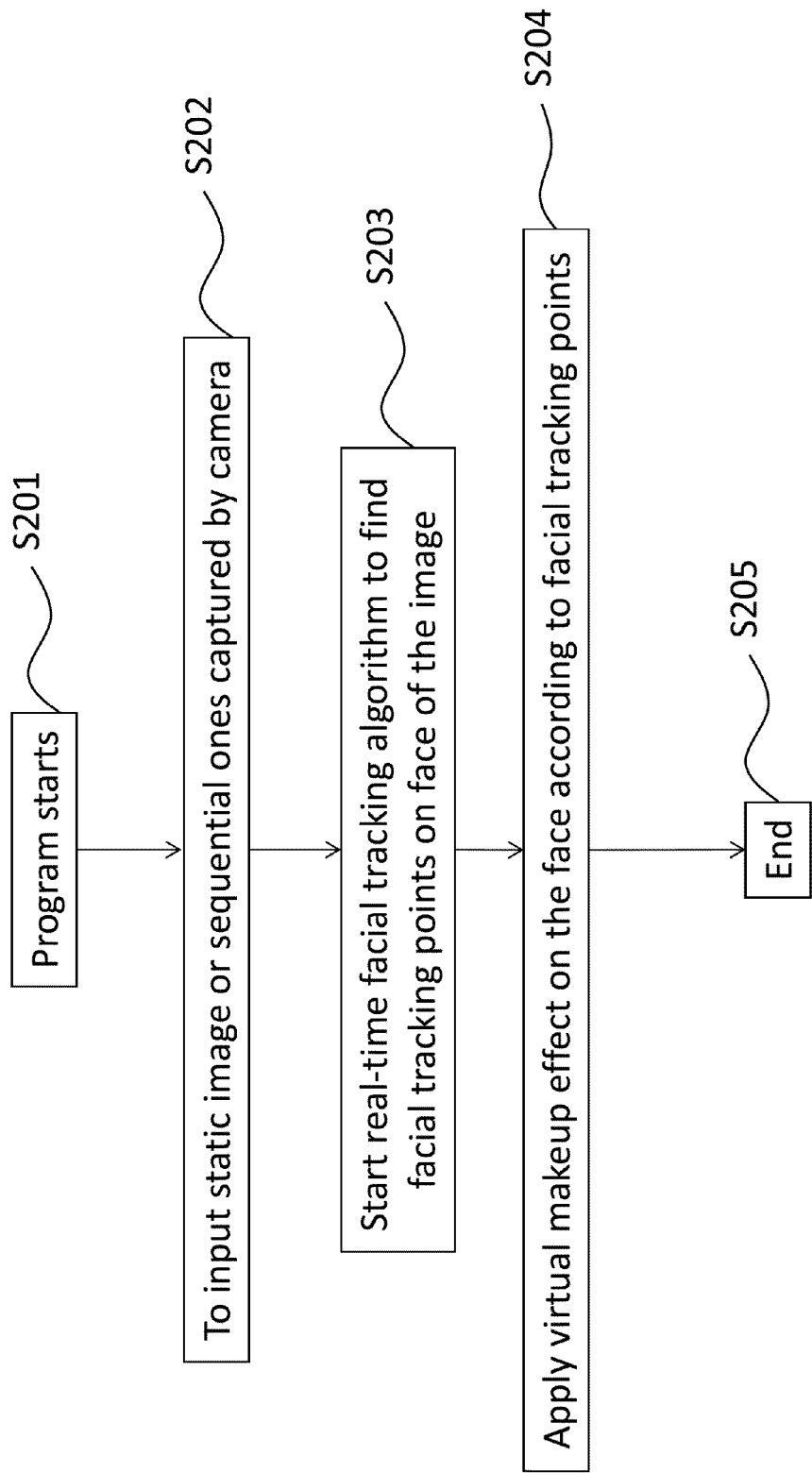
FIG. 9 is a flowchart diagram illustrating a method for applying virtual makeup in real-time to create virtual makeover effect according to a fifth embodiment.

FIG. 9 is a flowchart diagram illustrating a method for applying virtual makeup in real-time to create virtual makeover effect according to a fifth embodiment, which includes the following steps: Step S201: Application program starts, Step S202: A static image or a sequentially ordered set of images are captured by a camera. Step S203: A facial tracking algorithm is started to find a plurality of facial tracking points in real-time on a face region of a person in the image. Step S204: A virtual makeup applying step is performed by simulating of putting a makeup selected item on the face according to the facial tracking points in real-time. Step S205: Application program ends.

Figure 10:
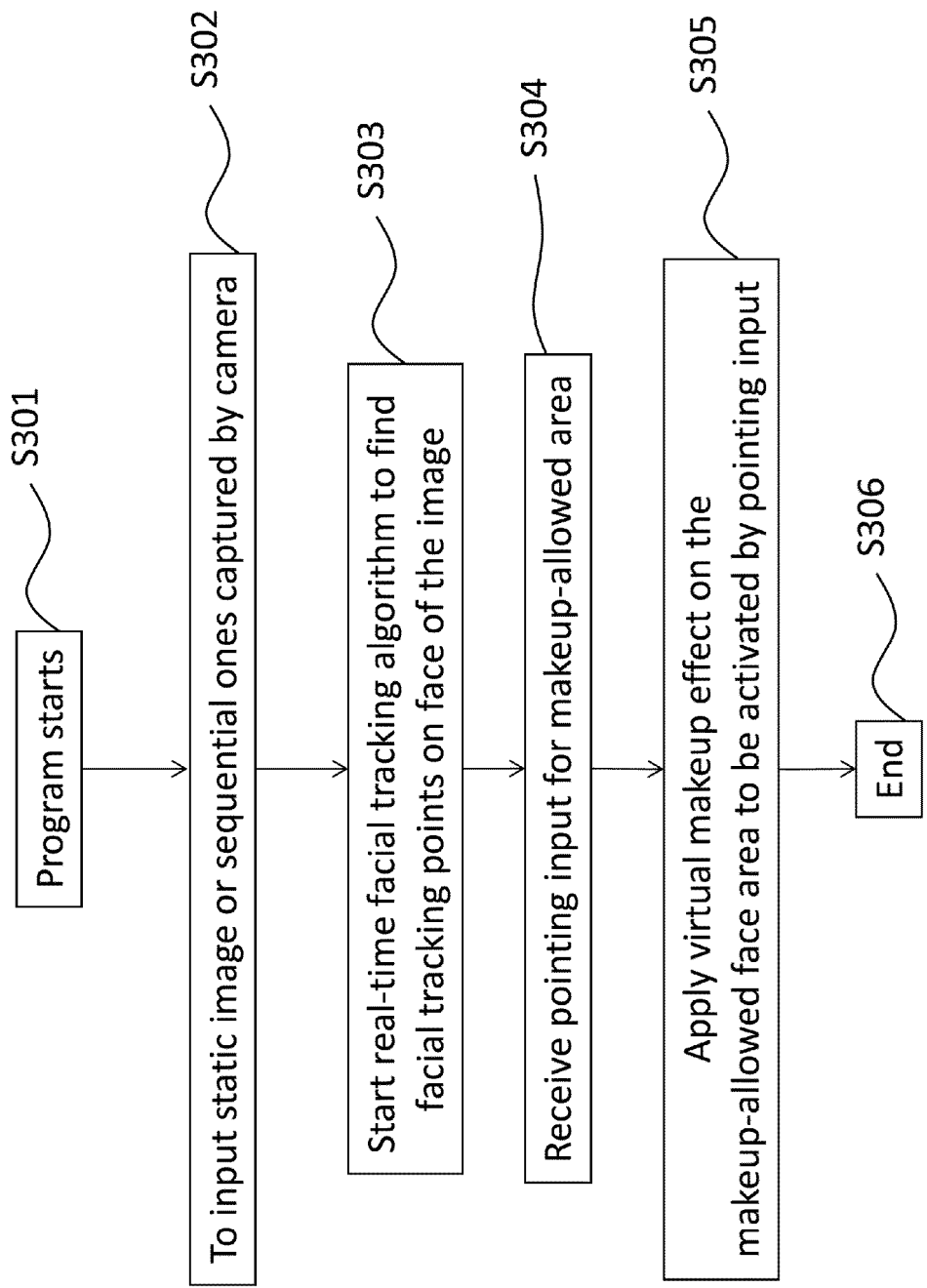
FIG. 10 is a flowchart diagram illustrating a method for applying virtual makeup in real-time to create virtual makeover effect according to a sixth embodiment.

FIG. 10 is a flowchart diagram illustrating a method for applying virtual makeup in real-time to create virtual makeover effect according to a sixth embodiment, which includes the following steps: Step S301: Application program starts. Step S302: A static image or a sequentially ordered set of images are captured by a camera. Step S303: A facial tracking algorithm is started to find a plurality of facial tracking points in real-time on a face region of a person in the image. Step S304: A pointing input is received from a pointing device in a makeup-allowed area. The pointing input is the location data of the tip or top portion of the pointing device in the makeup-allowed area. Step S305: A virtual makeup applying step is performed by simulating of putting a makeup selected item in the makeup-allowed area within the face region using the pointing device upon activating according to the facial tracking points in real-time; Step S306: Application program ends.

Figure 11:
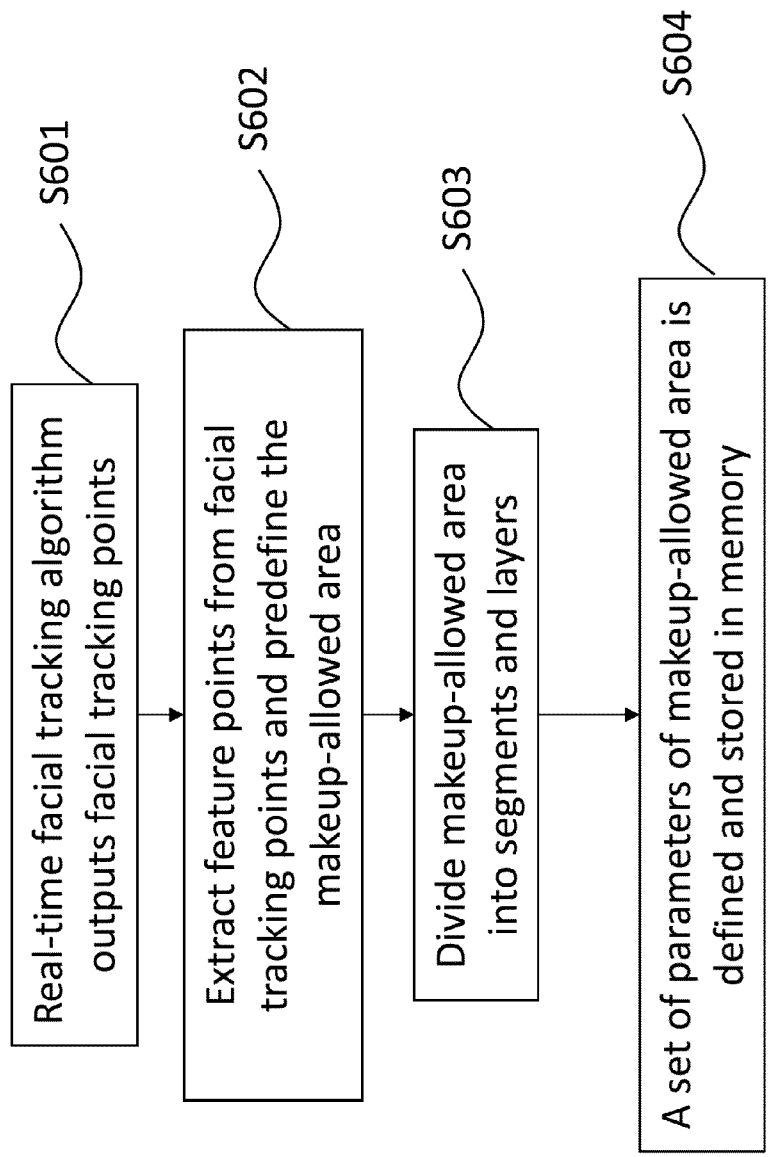
FIG. 11 is a flowchart diagram of a method for defining a plurality of virtual makeup-allowed areas by facial tracking according to an embodiment

FIG. 11 is a flowchart diagram of a method for defining virtual makeup-allowed areas by facial tracking according to an embodiment, which includes the following steps: Step S601: Facial tracking algorithm is performed to output a plurality of facial tracking points in real-time. Step S602: A plurality of feature points are extracted from the facial tracking points and the makeup-allowed area is predefined. Step S603: The makeup-allowed area is divided into areas, segments and layers. Step S604: A set of parameters of the makeup-allowed area is defined and stored in a memory.

Figure 12:
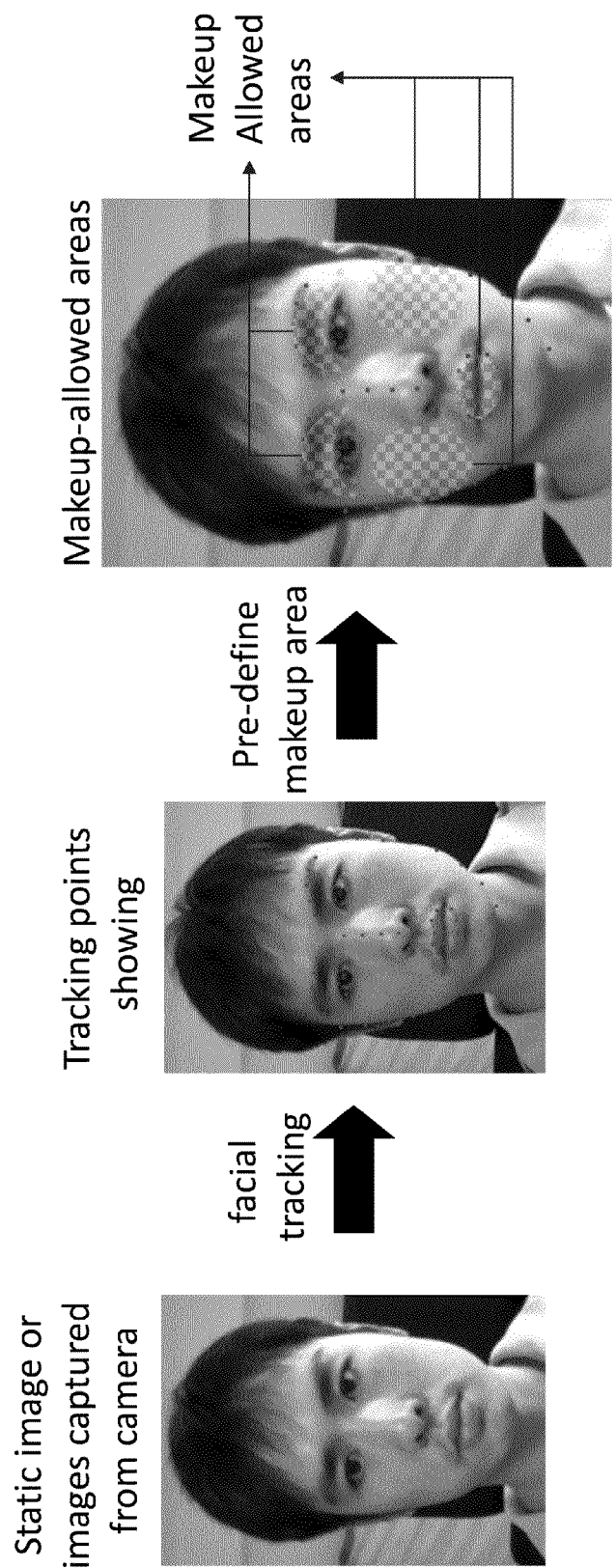
FIG. 12 illustrates a plurality of makeup-allowed areas pre-defined according to the location information of each facial tracking point obtained during facial tracking.

Referring to FIG. 12, a plurality of makeup-allowed areas are pre-defined according to the location information of each facial tracking points (in the form of red dots) during facial tracking. As shown by the superimposed scattered blue polka-dots regions indicating the makeup-allowed areas, these makeup-allowed areas can be designated as a lip area, an eyelid area, etc. . . . . Some of the makeup-allowed areas are surrounded, encircled, or merely defined accurately by the facial tracking points. A plurality of feature points as shown in the illustrated embodiment in FIG. 12 being designated as turquoise-colored dots can be derived through the corresponding adjacent facial tracking points (red dots) within the same makeup-allowed area. The feature points combined with the tracking points help to define the boundaries of some of the makeup-allowed areas. Makeup can be applied flexibly and cumulatively within each area of one makeup-allowed area surrounded by enclosed a group of facial tracking points.

Figure 13:
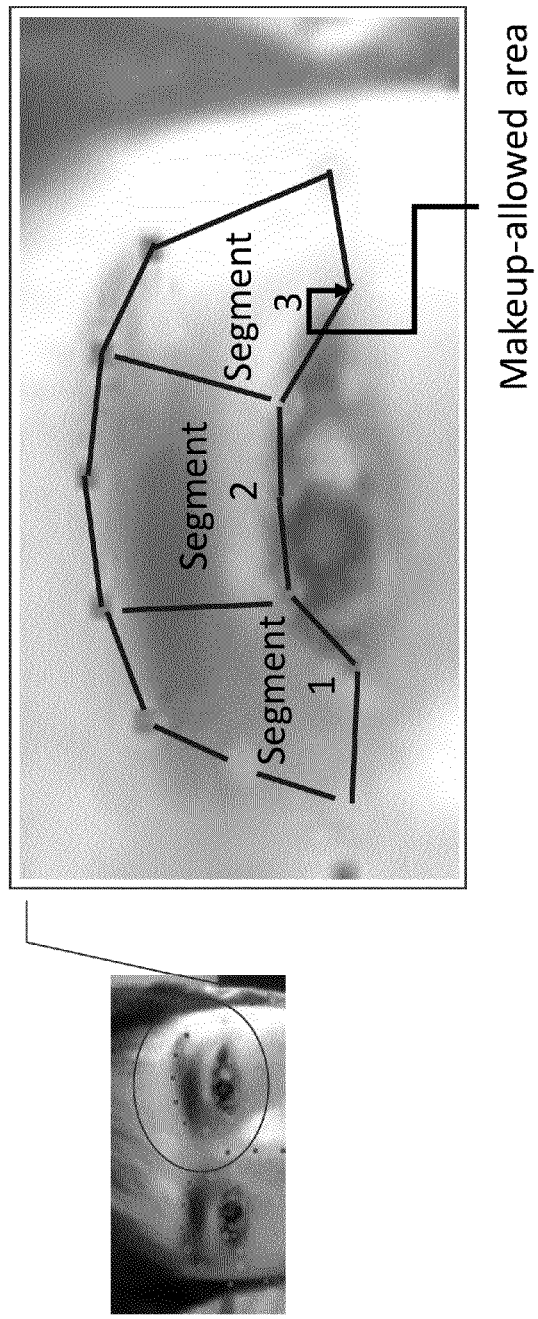
FIG. 13 shows the makeup-allowed area divided into a plurality of segments.
Figure 14A:
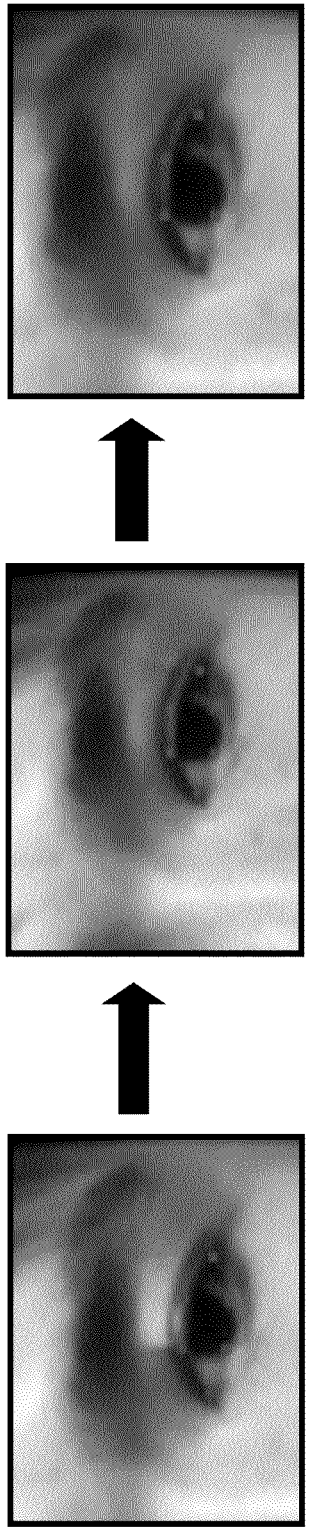
FIGS. 14a and 14b show virtual makeup applied in multiple number of segments consecutively and continuously
Figure 14B:
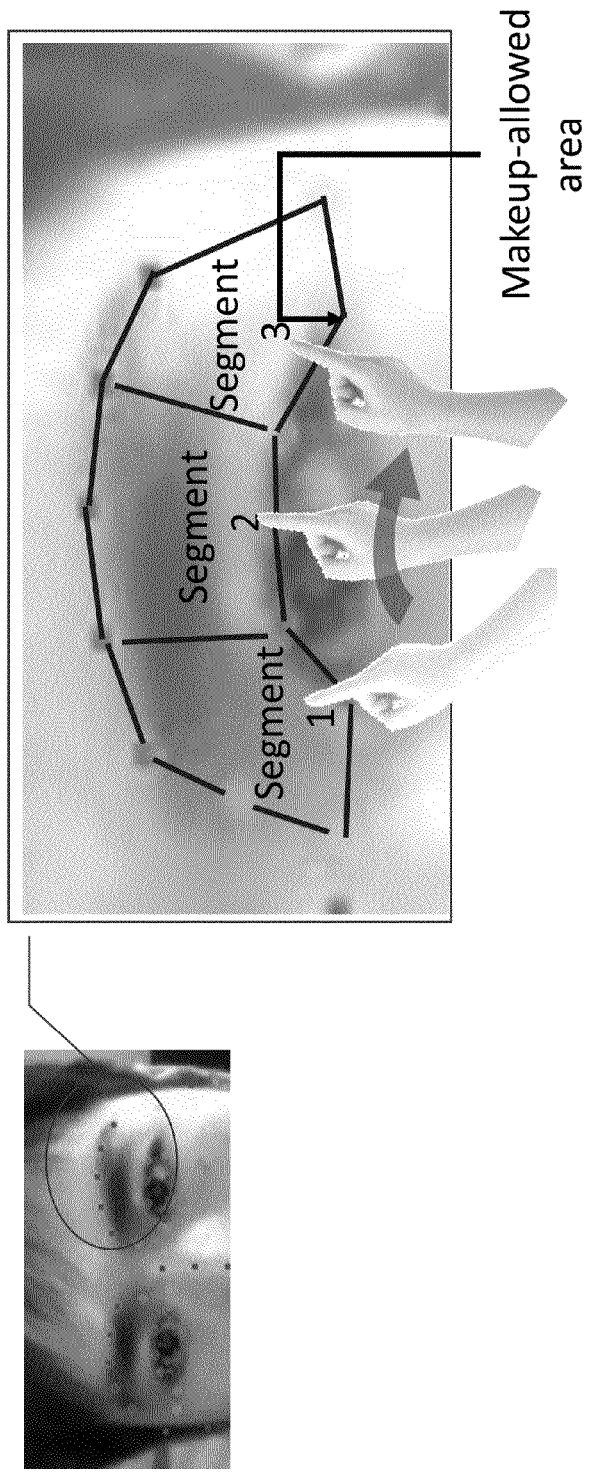
Figure 15:
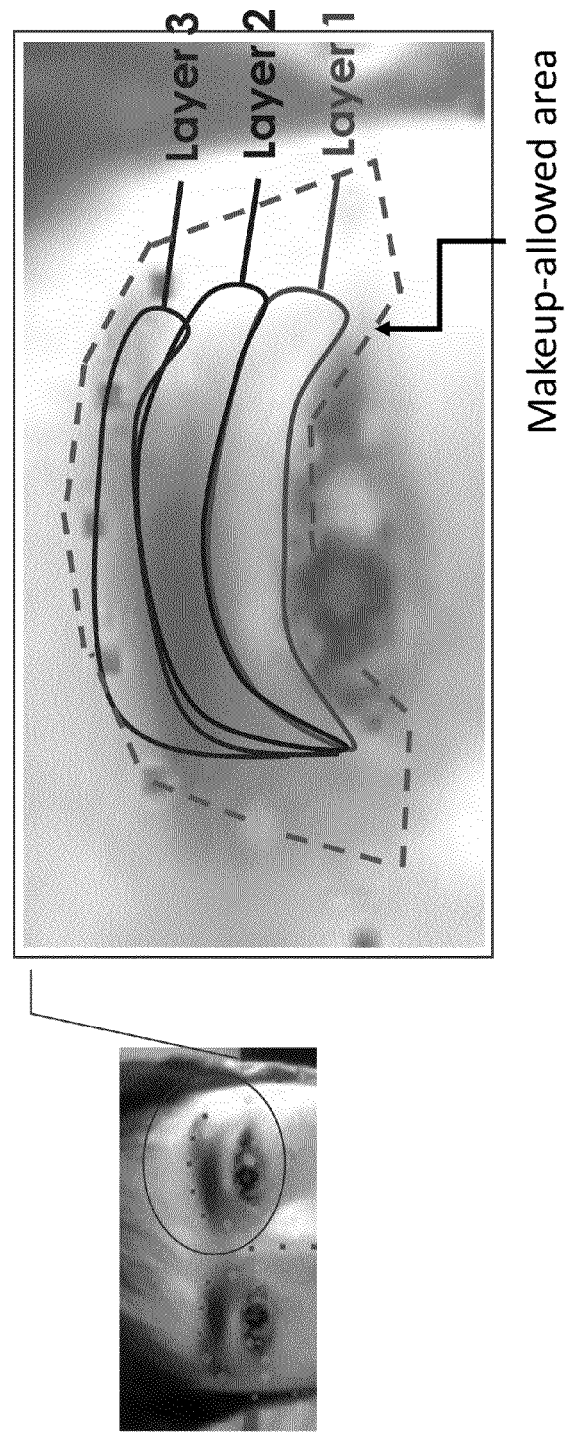
FIG. 15 shows an eyelid area divided into a plurality of layers of pre-defined makeup areas.

As shown in FIG. 13, after the makeup-allowed area is defined by the combinations of feature points and tracking points, the makeup-allowed area can then be divided into a plurality of segments. If a virtual makeup input tool has entered any segment, the application program would determine and check as to which of the segments is activated by the virtual makeup input tool. As a result, virtual makeover effect will be produced in the activated segment. In addition, as shown in FIG. 14*a*, virtual makeup are applied in multiple number of segments consecutively and continuously, in which 3 segments are applied virtual makeup one by one (from left to right). Furthermore, the same 3 segments are shown in greater details along with their respective boundary lines (blue lines) in FIG. 14*b*. Meanwhile, referring to FIG. 15, each eyelid area can also be divided into a plurality of layers of pre-defined makeup areas, i.e. a layer 1, a layer 2, and a layer 3. The method for defining layers is done similarly as the method for defining segments in the makeup-allowed area. Referring to FIG. 16, three virtual visual effects that can be applied in each eyelid area, including (a) color series, (b) alpha blending, and (c) superposition. Regarding alpha blending visual effect, it is defined as follow: the input color can possess degrees of transparency from 0% to 100%, in which the degree of transparency can be proportional, for example, using blue color using a virtual makeup input tool, to be inputted to a makeup-allowed area using a virtual makeup input tool will produce 20% translucent blue color (or of 80% transparent), and by drawing or inputting twice using the virtual makeup input tool, it will change to 40% translucent blue color, and can be repeated until 100% translucent/opaque blue color is achieved (or equal to 0% transparent). Regarding superposition, it is defined as follow: color can be mixed or blended together to obtain cumulative effects, for example, by adding green color using a virtual makeup input tool to be inputted to one segment in a makeup-allowed area will produce 20% green color, and by drawing or inputting twice using the virtual makeup input tool, it will change to 40% in green color, and furthermore, by adding red color to be inputted to the same makeup-allowed area segment will be blended and mixed with the 40% in green color to achieved the mixed blended color. Regarding color series, it is defined as follow: each make-up allowed area can possess multiple number of colors at the same time, similar to the different color bands found in a rainbow, and the color of each layer can include alpha blending and superposition effects. In alternative embodiments, the methods for defining virtual makeup-allowed areas by facial tracking, for pre-defining the makeup-allowed areas according to the location information of each facial tracking points during facial tracking, and for dividing the makeup-allowed areas into layers and segments can also be adapted for the markup-allowed areas including, such as lips and cheeks, or any makeup-allowed area that has been enclosed by a group of tracking points.

Figure 17:
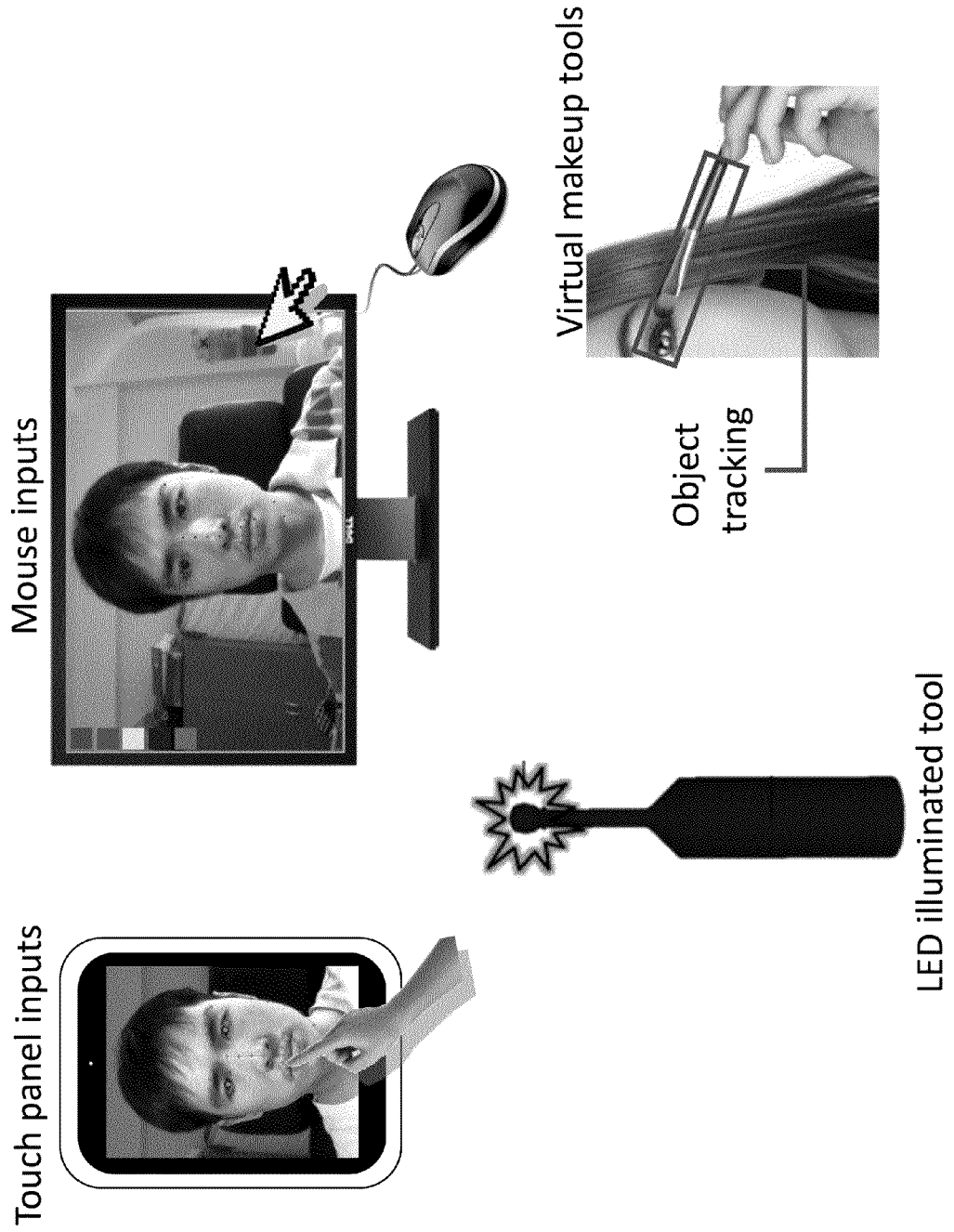
FIG. 17 shows a plurality of virtual makeup input tools used to apply virtual makeup in the embodiments of present invention.
Figure 18:
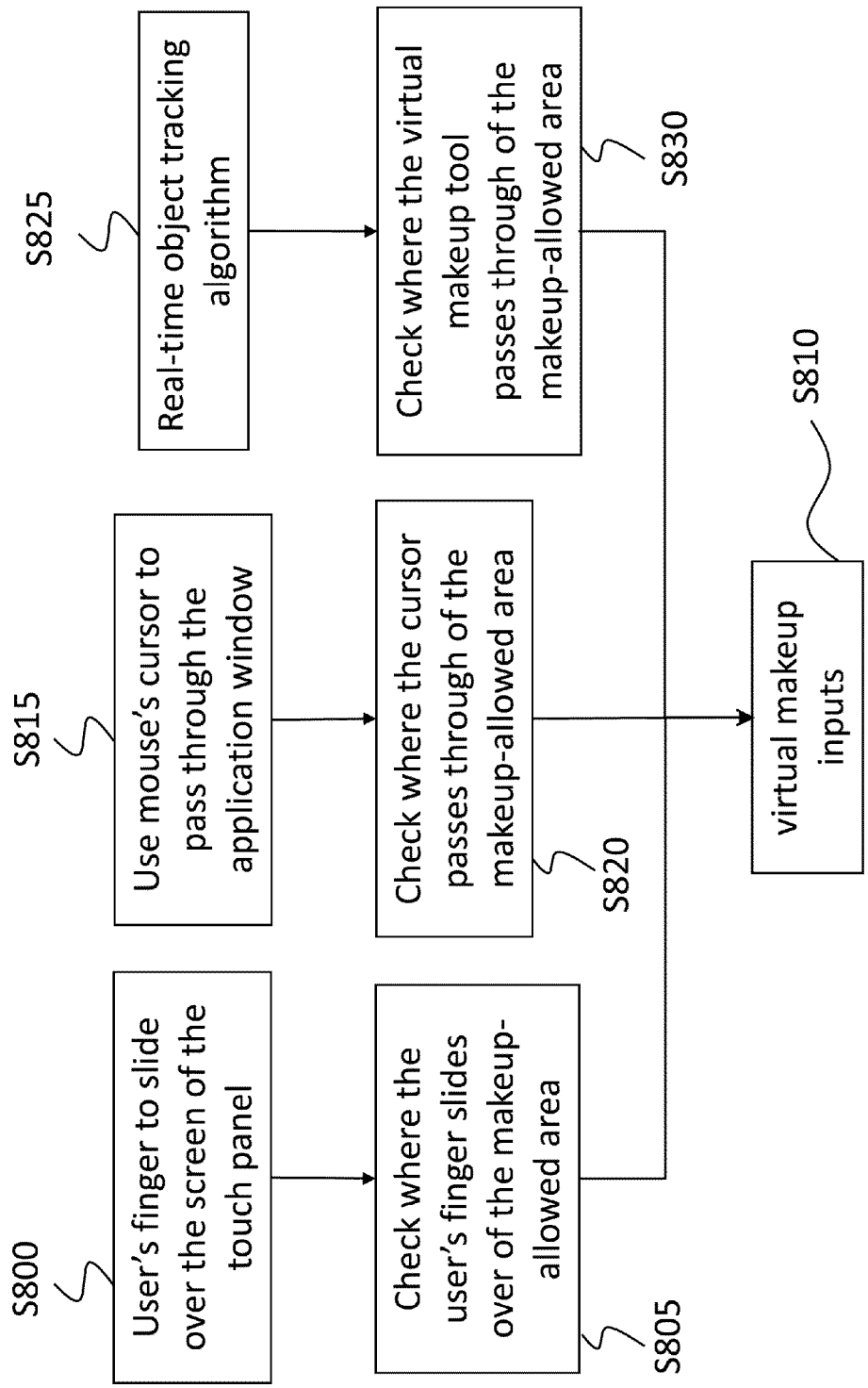
FIG. 18 shows a flowchart for apply virtual makeup in real-time using a finger, a mouse cursor or a tracked object as the virtual makeup input tool according to yet another embodiment of present invention.

As shown in FIG. 17, a plurality of virtual makeup input tools can be used to apply virtual makeup in real time. For example, referring to FIG. 18 in yet another embodiment, in Step S800, a user's finger acting as the virtual makeup input tool can slide over the screen of the touch panel. Then in Step S805, the application program checks to see which segments or layers the user's finger has slid over in the makeup-allowed area. Then in Step S810, virtual makeup is applied in real-time. For example, referring to Step S815, a mouse cursor acting as the virtual makeup input tool can pass by or through the makeup-allowed area. Then in Step S820, the application program checks to see which segments or layers the mouse cursor has passed through in the makeup-allowed area. Then in Step S810, virtual makeup is applied in real-time. For example, referring to Step S825, an object acting as the virtual makeup input tool can be moved through the makeup-allowed area. Then in Step S830, the application program checks to see which segments or layers the object has passed through in the makeup-allowed area. Then in Step S810, virtual makeup is applied in real-time. More illustrative descriptions are provided for showing the use of user's finger to slide over the makeup-allowed areas on the screen of the touch panel to do virtual makeup in FIG. 19, and showing the use of the mouse's cursor passing through the makeup-allowed areas to do virtual makeup in FIG. 20.

Figure 21:
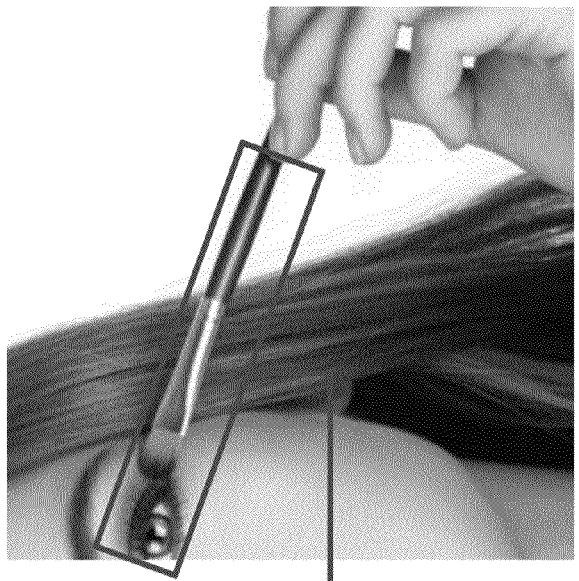
FIG. 21 shows a virtual cosmetic tool captured by the camera in real-time, and to have position thereof tracked to perform the virtual makeup upon approaching of the makeup-allowed area.
Figure 22A:
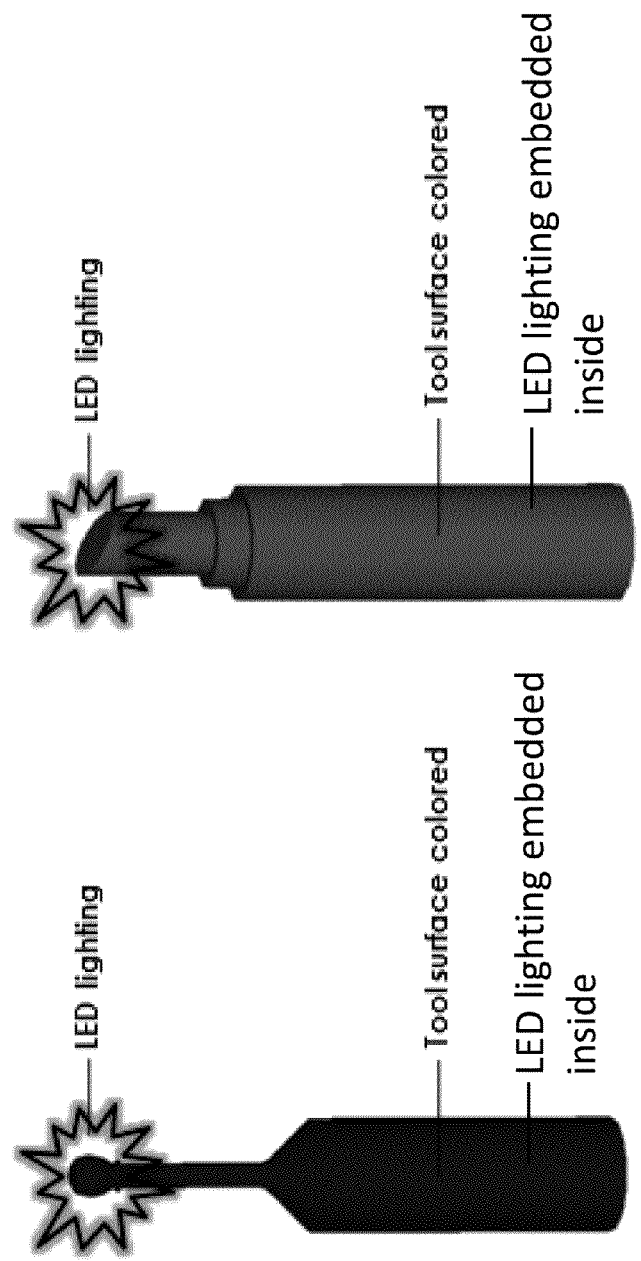
FIGS. 22a and 22b show additional examples of virtual makeup tools which incorporate LED lighting tip objects, and a finger of the user, respectively.
Figure 22B:
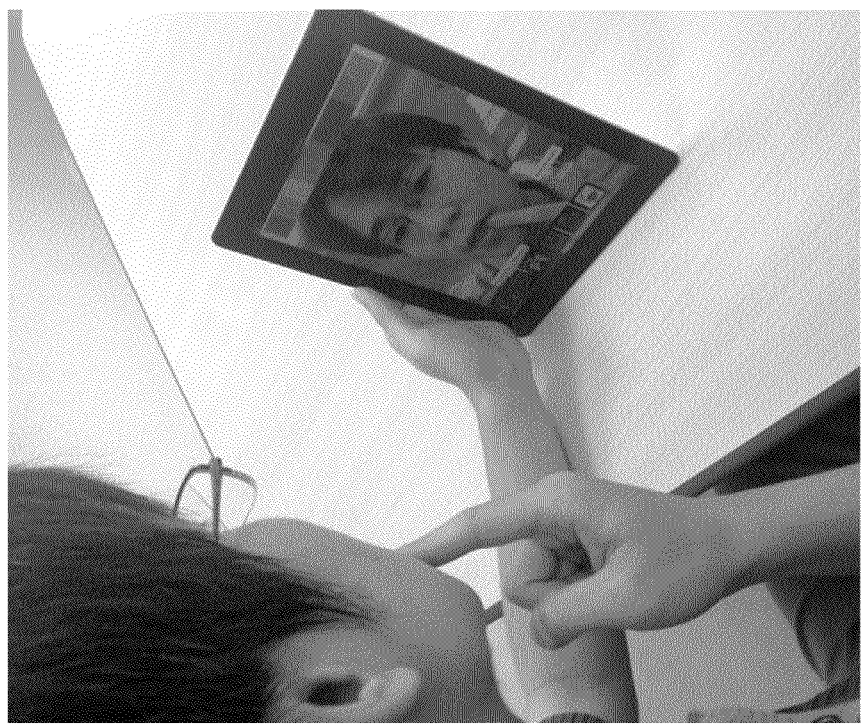

Meanwhile, the user can use a virtual cosmetic tool which is also captured by the camera in real-time. An object tracking algorithm is applied to track the position of the virtual cosmetic tool to perform the virtual makeup upon approaching of the makeup-allowed area as shown in FIG. 21. As shown in FIG. 22, additional examples of the virtual makeup tool can be exemplified by a blue or purple colored makeup tool with an LED bulb configured at a top region thereof for providing illumination, along with LED lighting embedded in the lower body region therein. The color of the virtual makeup tool can also be green. In addition, the object tracking can be performed to track a hand as the virtual makeup tool. Furthermore, as shown in FIG. 22*b*, in alternative embodiment, a finger can also be used as a virtual makeup tool, with the tip of the finger of the user functioning as the pointing input.

Figure 23:
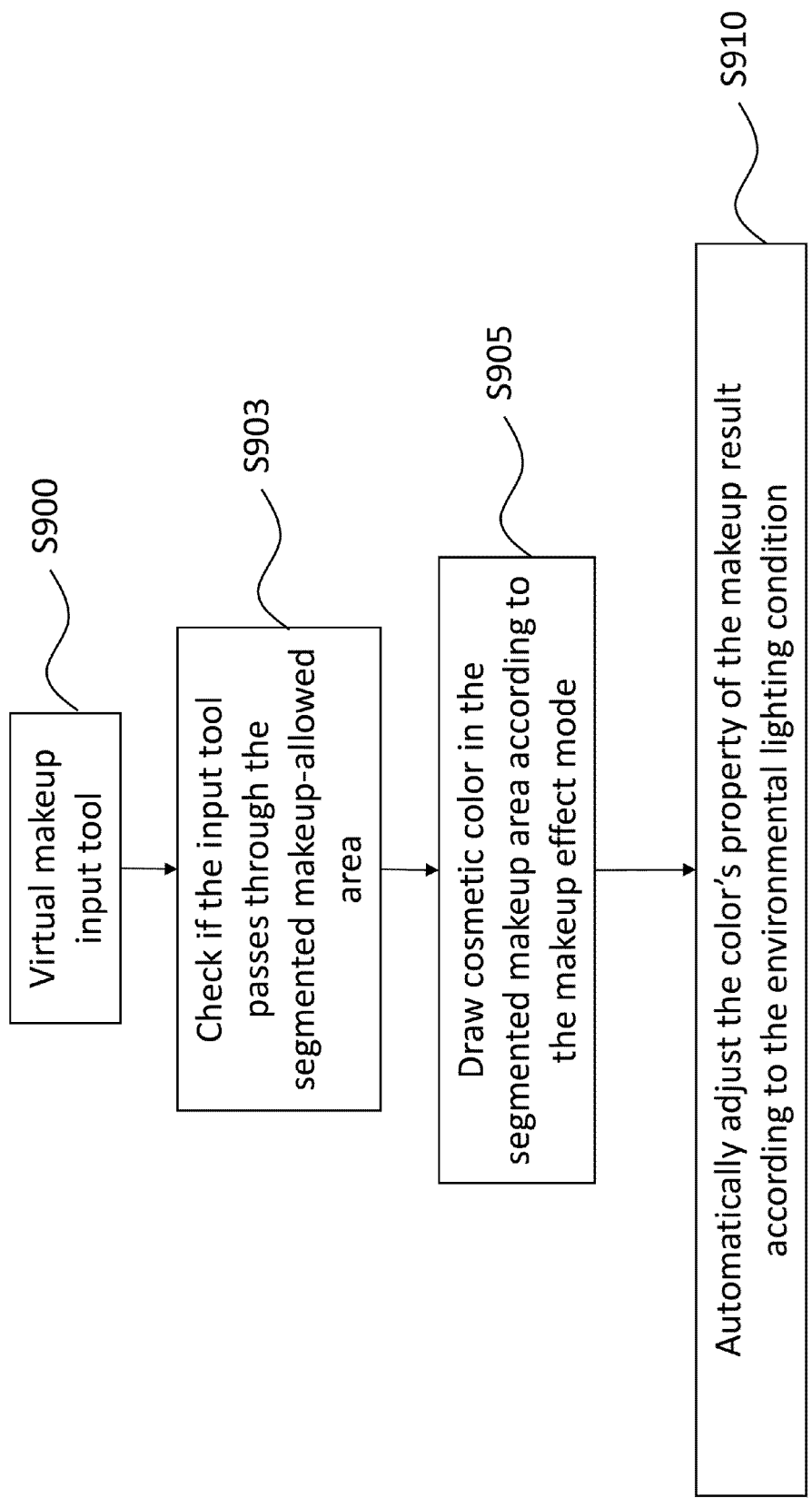
FIG. 23 shows a flowchart showing a method for applying virtual makeup using a virtual makeup input tool in real-time according to a seventh embodiment.
Figure 24A:
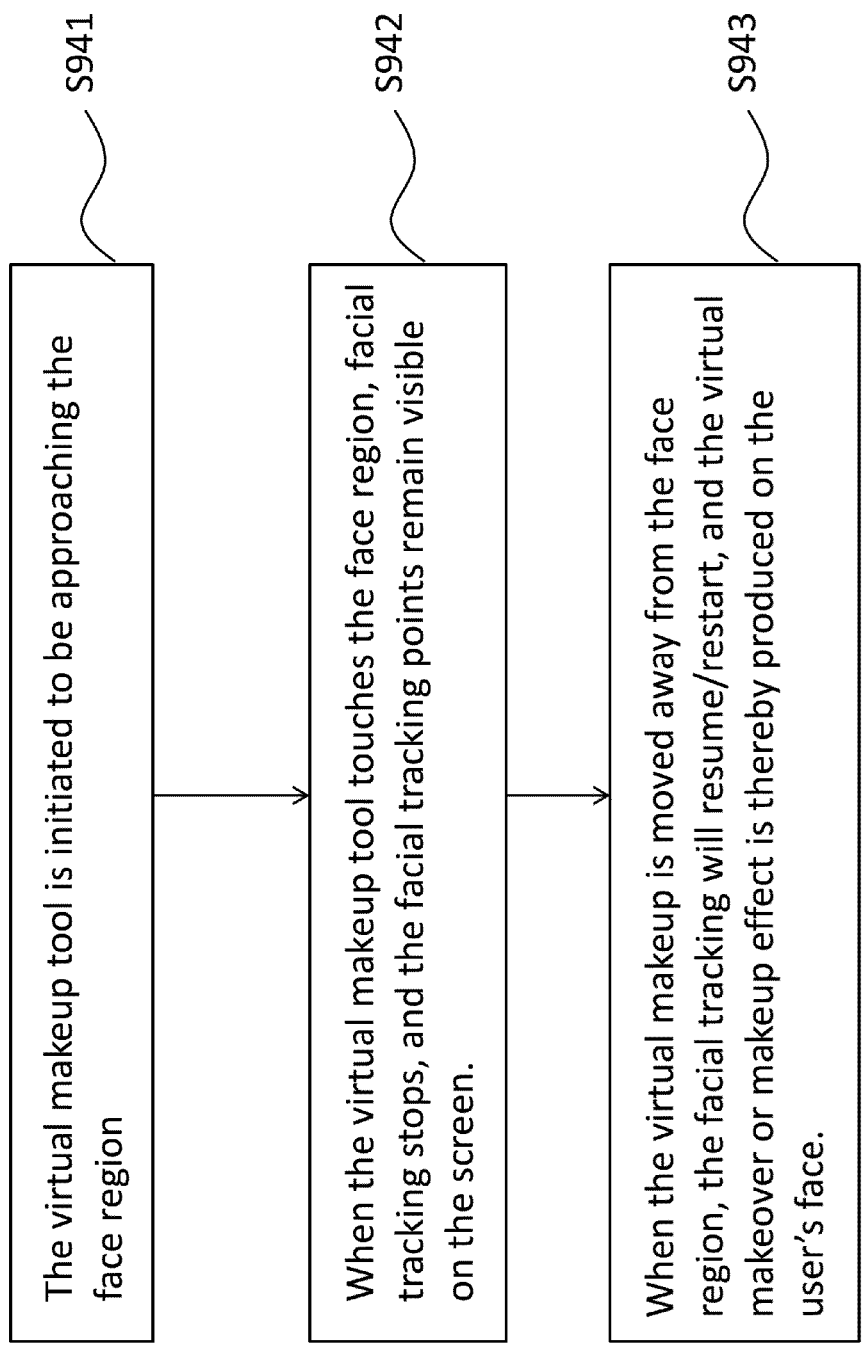
FIGS. 24a and 24b shows a flowchart and an image representation of the method for applying virtual makeup using a virtual makeup input tool in real-time according to the seventh embodiment.
Figure 24B:
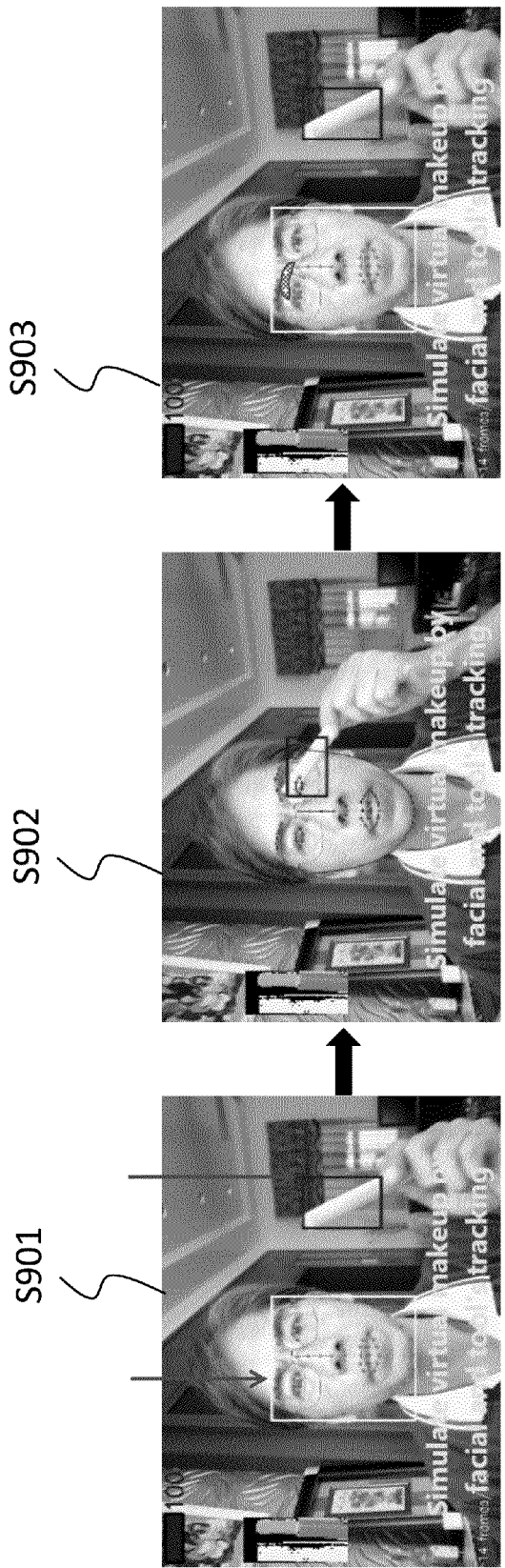

Referring to a flowchart showing a method for applying virtual makeup in real-time according to a seventh embodiment in FIG. 23 including of the following steps: Step S900: Provide virtual makeup input tool. Step S903: the virtual makeup input tool is checked to see if it has passed through any of the segments in the makeup-allowed area. Step S905: Paint or draw a selected cosmetic item to apply a cosmetic color effect on the selected segment in the makeup-allowed area according to the makeup effect mode. Step S910: Automatically adjust the property for the cosmetic color effect of the applied makeup result according to the environmental lighting condition. When applying object tracking of the virtual makeup tool for performing virtual makeup in real-time, the hand/tool will occlude the face image to cause a breakdown or failure of the corresponding facial tracking. With the facial tracking being frozen while the virtual makeup tool is approaching the face region, the virtual makeup can be applied on the face correctly, and the facial tracking can be restarted while the virtual makeup tool is moved away from the face region. For a better understand of the above, refer to FIGS. 24*a* and 24*b*, which shows a flowchart and image representations of following steps: Step S941: the virtual makeup tool is initiated to be approaching the face region; Step S942: when the virtual makeup tool touches the face region, facial tracking stops, and the facial tracking points remain visible on the screen; Step S943; when the virtual makeup is moved away from the face region, the facial tracking will resume/restart, and the virtual makeover or makeup effect is thereby produced on the user's face.

Figure 25:
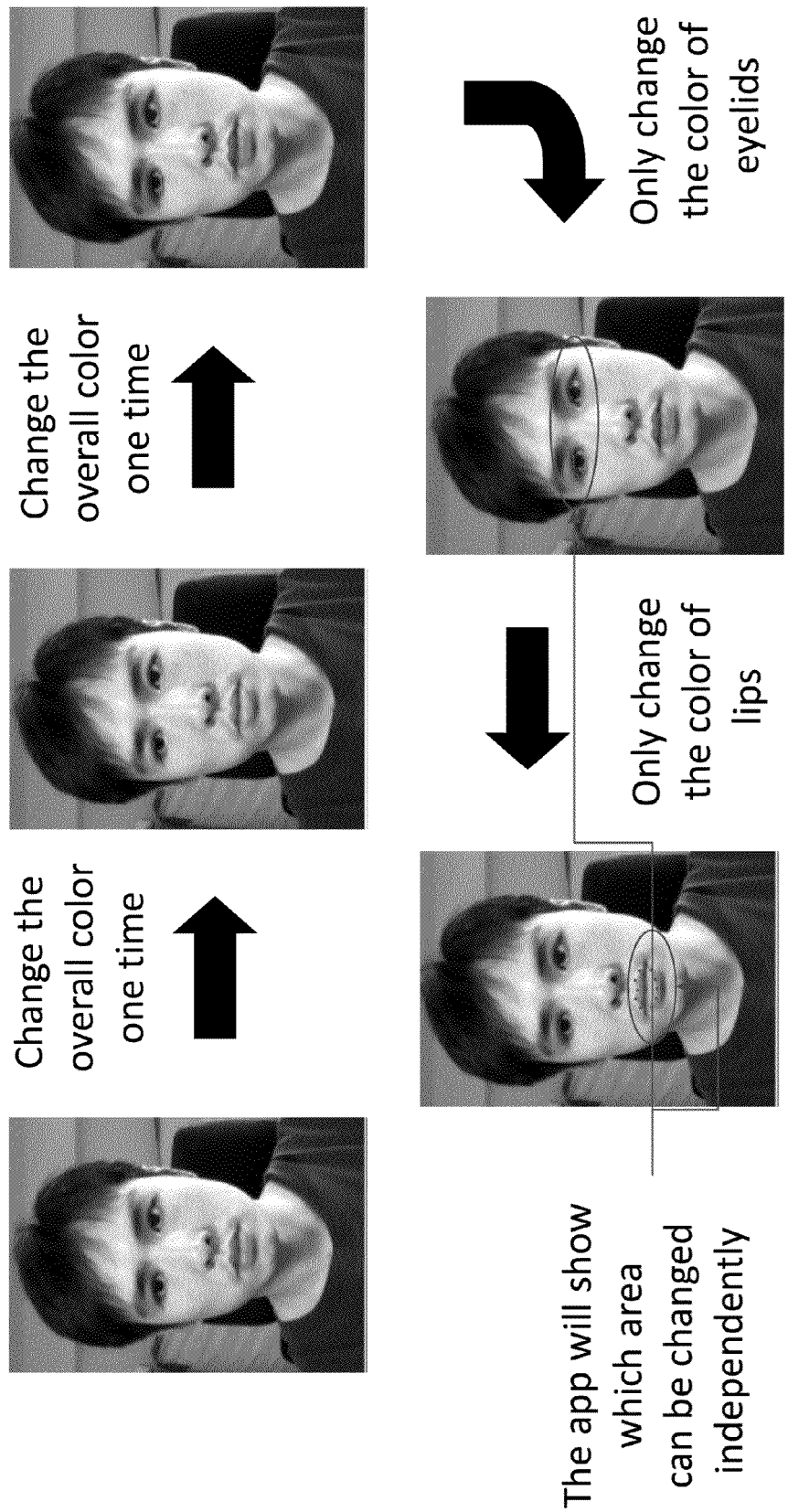
FIG. 25 shows that make-up color configured in all of the makeup-allowed areas can be changed to one same color together at the same time or to have one of the makeup-allowed area color changed independently and separately.

Referring to FIG. 25, during the performing of one or more virtual makeup task items according to one customized makeup selected item, the user can change the make-up color configured in all of the makeup-allowed areas to that of one same color together all at the same time. In addition, alternatively, according to another customized makeup selected item, the user can also independently change the make-up color of each makeup-allowed area separately, so that for example, the color of the mouth may be configured to be different to one of the eyelids.

The makeover effect produced by the method of applying virtual makeup to a person driven by facial tracking in real-time is dependent of the lighting condition. As an illustrative example shown in FIG. 26*a*, if the lighting condition is underexposed, the luminance of the makeup effect or result should be lower. On the other hand, as also shown in FIG. 26*b*, if the lighting condition is overexposed, the luminance of the makeup effect or result should be higher.

Figure 27:
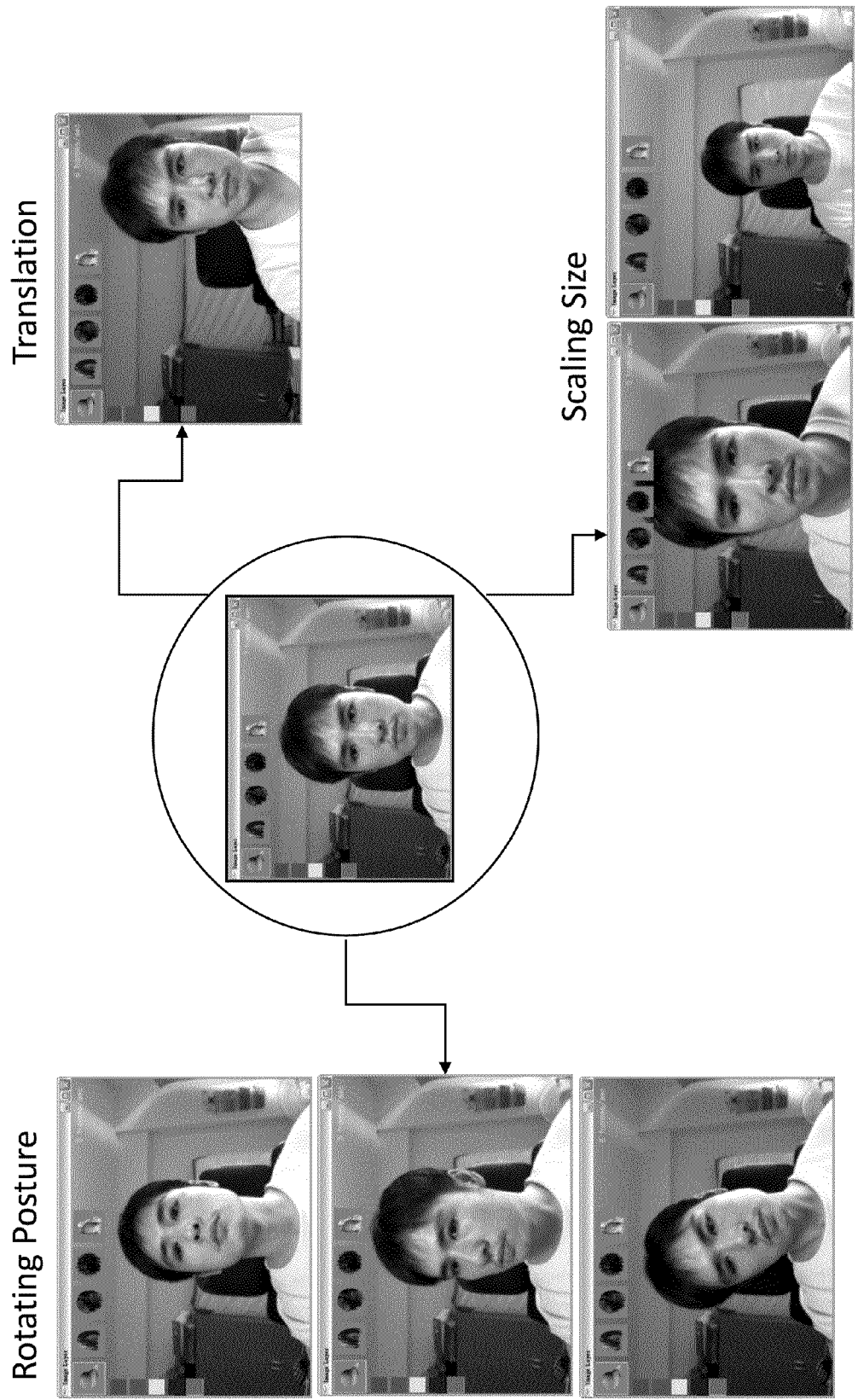
FIG. 27 shows that the virtual makeover effects can be adjusted in accordance with facial posture rotation, size scaling, and translation.

According to an embodiment of the present invention as shown in FIG. 27, the virtual makeover or makeup effects can be adjusted in real-time in accordance with rotating of the facial posture, size scaling of the face, and the translation of the face, respectively.

Figure 28:
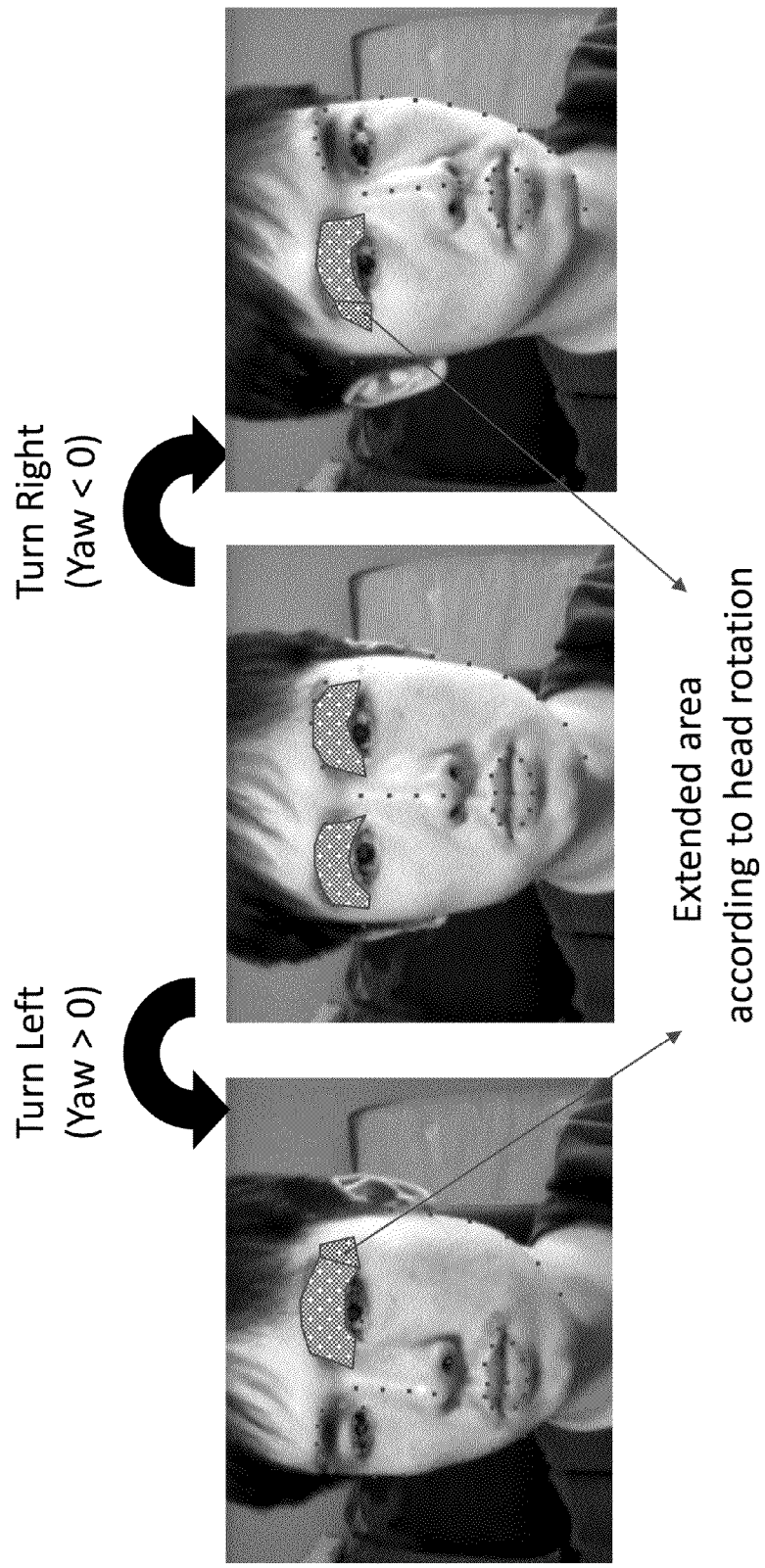
FIG. 28 shows that size of the make-up allowed area of one of the eyelids can become larger to accommodate head rotation.

Referring to FIG. 28, corresponding to the user's head rotation, the application program is able to adjust the size of the make-up allowed area of one of the eyelids to become larger in size. As a result, the locations of the feature points are changed according to the head rotation, thereby rendering an enlarged makeup-allowed area as shown in FIG. 28. The above makeup-allowed area size adjustment allows for improved simulation realism of the produced virtual makeover effect in real-time.

According to still another embodiment of the present invention as shown in FIG. 29, virtual makeup can also be applied on a 3D face model using one or more set of pre-defined turnkey makeup texture package. The 3D face model can be obtained by facial tracking on raw image in real time. The mirrored set of pre-defined turnkey makeup texture package and the facial tracked 3D face model are combined together to produce virtual makeover effects on the raw image of the 3D face model in real time. The pre-defined turnkey makeup texture package is a complete set of makeup to allow the user to obtain instant virtual makeover effect without spending too much time to apply each makeup effect item one by one. The pre-defined turnkey makeup texture package includes also makeup features such as eye liner, mascara, and pupil colored contacts.

According to still further yet another embodiment of the present invention as shown in FIG. 30, virtual makeup can also be applied on a 3D face model using one or more set of pre-defined adjustable makeup texture package. Virtual makeup customization effect can be further produced by making changes to the color within one or more makeup-allowed areas to provide for color overlapping as shown in FIG. 30. The color overlap effect can be produced using a mouse cursor, touch control or the tip of a tracked object to make a color change to a blue color (from the pink color previously) so as to produce further customization.

Figure 32:
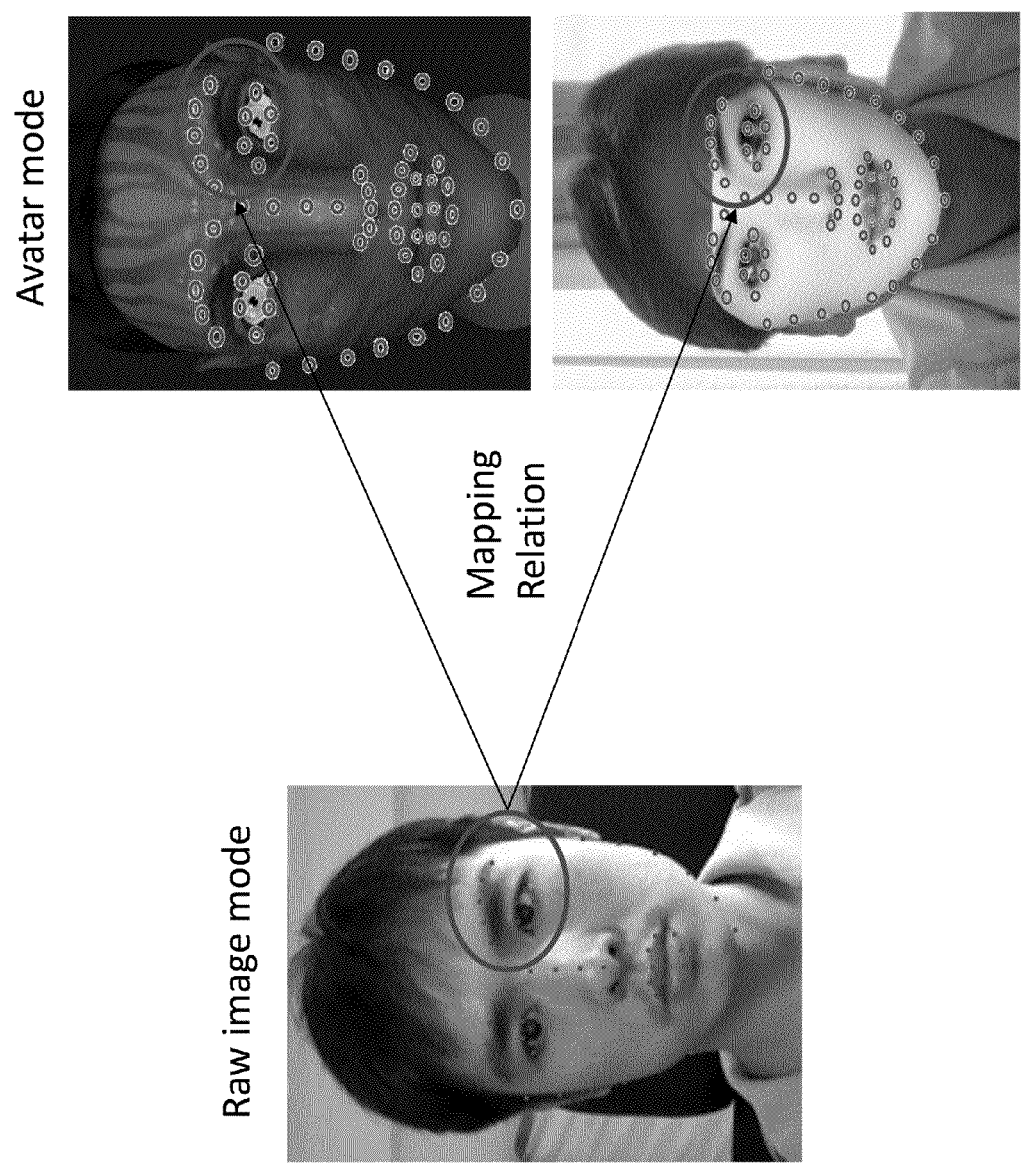
FIG. 32 shows mapping relationship of the corresponding feature points between different display modes.

According to another embodiment of the present invention as shown in FIG. 31, virtual makeup can also be applied on a face image of a 3D avatar (aka avatar mode) or a 3D avatar with a face mask (aka mask mode) (in real-time) corresponding to the makeover effects as shown on the raw image of the user during facial tracking in real time. In this embodiment, the user can switch back and forth between the two display modes, i.e. one display mode is a 3D avatar face image mode, and another display mode is the raw image mode of the user containing virtual makeover effects. The mapping relationship of the corresponding feature points between different display modes is illustrated in FIG. 32. In addition, the virtual makeup or makeover effects can be directly applied on the 3D avatar in real time without time lag.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A method for applying virtual makeup in real-time to create virtual makeover effects, comprising:
    capturing a static image or a sequentially ordered set of images by a camera;
    starting a facial tracking algorithm to obtain a plurality of facial tracking points in real-time on a face region of a person; and
    performing a virtual makeup applying step by simulating of putting a makeup selected item on the face according to the plurality of facial tracking points in real-time,
    wherein the tracking points include an outer contour of a face, a nose, and a plurality of makeup applied areas of the user;
    capturing a virtual makeup input tool by the camera in real-time, wherein an object tracking algorithm is applied to track the position of the virtual makeup tool to perform the virtual makeup upon approaching of the face region of the person.

2. The method as claimed in claim 1, further comprising:
    receiving a pointing input from a pointing device in one of the makeup-allowed areas before performing the virtual makeup applying step, wherein using the pointing device upon activating according to the facial tracking points for simulating of putting the makeup selected item in the one makeup-allowed area in the virtual makeup applying step.

3. The method as claimed in claim 2, wherein the makeup-allowed areas are defined in the following steps:
    extracting a plurality of feature points from the plurality of facial tracking points and predefining the makeup-allowed area;
    dividing each makeup-allowed area into a plurality of areas, segments or layers; and
    defining and storing a set of parameters of the makeup-allowed areas in a memory,
    wherein each area has a plurality of segments or layers.

4. The method as claimed in claim 3, wherein the plurality of feature points are derived through the corresponding adjacent facial tracking points within the same makeup-allowed area.

5. The method as claimed in claim 3, wherein upon entering of the virtual makeup input tool into one segment, layer, or area, checking to see if the one segment, layer, or area is activated and producing virtual makeover effect in the activated segment, wherein the virtual makeup input tool is a physical object.

6. The method as claimed in claim 5, wherein virtual makeup are applied in multiple number of segments consecutively and continuously.

7. The method as claimed in claim 3, wherein a plurality of virtual visual effects comprising color series, alpha blending, or superposition are capable of being applied in the respective layers in an eyelid area, a cheek area, or a lip area.

8. The method as claimed in claim 5, wherein the virtual makeup input tool is moving through the makeup-allowed area, and an application program checks to see which segments or layers the object has passed through in the makeup-allowed area, and then virtual makeup is applied in real-time.

9. The method as claimed in claim 5, wherein the virtual makeup input tool is a blue or green illuminated object comprising an LED bulb configured at a top region thereof and an LED bulb embedded in the lower body region therein for providing illumination.

10. The method as claimed in claim 5, further comprising:
    checking to see if the virtual makeup input tool has passed through any of the segments in the makeup-allowed area;
    painting or drawing a selected cosmetic item to apply a cosmetic color effect on the selected segment in the makeup-allowed area according to a makeup effect mode; and adjusting automatically a property for the cosmetic color effect of the applied makeup result according to an environmental lighting condition.

11. The method as claimed in claim 5, wherein when after the virtual makeup input tool touches and occludes the face image to cause a breakdown of the corresponding facial tracking, the facial tracking is then frozen while the virtual makeup input tool is approaching the face region, the virtual makeup is then applied on the face correctly, and the facial tracking is restarted while the virtual makeup input tool is moved away from the face region, and virtual makeover effect is thereby produced.

12. The method as claimed in claim 5, wherein during performing of one or more virtual makeup task items according to one customized makeup selected item, the make-up color configured in all of the makeup-allowed areas are changeable to one same color together at the same time or changeable independently to the make-up color of each makeup-allowed area separately.

13. The method as claimed in claim 5, wherein the makeover effect produced is dependent of the lighting condition, the luminance of the makeup effect becomes lower when the lighting condition is underexposed, and the luminance of the makeup effect becomes higher when the lighting condition is overexposed.

14. The method as claimed in claim 5, wherein the virtual makeover effects are adjusted in real-time in accordance with rotating of the facial posture, size scaling of the face, and the translation of the face, respectively.

15. The method as claimed in claim 14, wherein corresponding to the user's head rotation, the make-up allowed area of one of the eyelids is adjusted to become larger in size, and the locations of the feature points therein are changed according to the head rotation.

16. The method as claimed in claim 1, wherein virtual makeup is applied on a 3D face model using one or more set of pre-defined turnkey makeup texture package, the mirrored set of pre-defined turnkey makeup texture package and the facial tracked 3D face model are combined together to produce virtual makeover effects on the raw image of the 3D face model in real-time.

17. The method as claimed in claim 1, wherein virtual makeup is applied on a 3D face model using one or more set of pre-defined adjustable makeup texture package, and color change is made within one or more makeup-allowed areas to provide color overlapping using a mouse cursor, touch control or the tip of a tracked object.

18. The method as claimed in claim 5, wherein the virtual makeup input tool is a user's finger moving through the makeup-allowed area, and an application program checks to see which areas, segments or layers the object has passed through in the makeup-allowed area, and then virtual makeup is applied in real-time.

* * * * *